(12) United States Patent
Chiticarlu et al.

(10) Patent No.: US 8,180,810 B2
(45) Date of Patent: May 15, 2012

(54) INTERACTIVE GENERATION OF INTEGRATED SCHEMAS

(75) Inventors: Laura Chiticarlu, Santa Cruz, CA (US);
Phokion Kolaitis, Los Altos, CA (US);
Lucian Popa, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 559 days.

(21) Appl. No.: 12/195,925

(22) Filed: Aug. 21, 2008

(65) Prior Publication Data

US 2010/0049728 A1 Feb. 25, 2010

(51) Int. Cl.
*G06F 17/30* (2006.01)
(52) U.S. Cl. ...................................................... 707/808
(58) Field of Classification Search .................. 707/808
See application file for complete search history.

(56) References Cited

U.S. PATENT DOCUMENTS

| | | | |
|---|---|---|---|
| 6,591,260 B1 * | 7/2003 | Schwarzhoff et al. | 1/1 |
| 6,615,204 B1 | 9/2003 | Menon | |
| 6,823,495 B1 | 11/2004 | Vedula et al. | |
| 6,826,568 B2 | 11/2004 | Bernstein et al. | |
| 7,149,746 B2 * | 12/2006 | Fagin et al. | 707/756 |
| 2006/0136428 A1 | 6/2006 | Syeda-Mahmood | |

OTHER PUBLICATIONS

Creasy, A Conceptual Graphs Approach to Conceptual Schema Integration, Lecture Notes in Computer Science, 1993, pp. 126-141.*
Chiticariu, Hernandez, Kolaitis, and Popa, Semi-Automatic Schema Integration in Clio, Sep., 2007, pp. 1326-1329.*
TreMer: A tool for relationship-driven model merging, [online]; [retrieved on Nov. 21, 2008]; retrieved from the Internet http://www.cs.toronto.edu/~chechik/tremer06.pdf.
A manifesto for model merging, [online]; [retrieved on Nov. 21, 2008]; retrieved from the Internet http://pubs.dbs.uni-leipzig.de/files/Brunet2006Amanifestoformodel.pdf.
An Algebraic Framework for Merging Incomplete and Inconsistent Views, [online]; [retrieved on Nov. 21, 2008]; retrieved from the Internet http://www.cs.toronto.edu/~sme/papers/2005/Sabetzadeh-RE05.pdf.
The PROMPT suite: interactive tools for ontology merging and mapping, [online]; [retrieved on Nov. 21, 2008]; retrieved from the Internet http://dit.unitn.it/~p2p/RelatedWork/Matching/noy02-prompt.pdf.
Evaluation of ontology merging tools in bioinformatics, [online]; [retrieved on Nov. 21, 2008]; retrieved from the Internet http://pubs.dbs.uni-leipzig.de/files/Lambrix2003Evaluationofontologymerging.pdf.
Modeling and Merging Database Schemas, [online]; retrieved on Nov. 21, 2008]; retrieved form the Internet http://citeseerx.ist.psu.edu/viewdoc/summary?doi=10.1.1.54.1560.

(Continued)

*Primary Examiner* — John E Breene
*Assistant Examiner* — Albert Phillips, III
(74) *Attorney, Agent, or Firm* — Cantor Colburn LLP; Brian Lambert

(57) ABSTRACT

Methods, systems and computer program products for interactive generation of integrated schemas. Exemplary embodiments include a method for schema integration, the method including recasting a first source schema into a first graph of concepts with HasA relationships, recasting a second source schema into a second graph of concepts with HasA relationships, identifying matching concepts in the first graph and the second graph based on correspondences between attributes of the concepts of the first and second graphs, producing an integrated schema, based on a fixed specification of matching concepts to merge, and generating a mapping from the first source schema to the integrated schema and from the second source schema to the integrated schema.

20 Claims, 16 Drawing Sheets

OTHER PUBLICATIONS

S. Abiteboul et al., Foundations of Databases, Addison Wesley Publishing Co., 1995, pp. 220-225.

N. Creignou and J. Hebrard. On generating all solutions of generalized satisfiability problems. ITA, 31(6):499-511, 1997.

D.S. Johnson, C.H. Papadimitriou, and M. Yannakakis. On generating all maximal independent sets. Information Processing Letters, 27(3):119-123, 1988.

A Comparative Analysis of Methodologies for Database Schema Integration, [online; [retrieved on Aug. 20, 2008]; retrieved from the Internet http://www.dit.unitn.it/~p2p/RelatedWork/Matching/p323-bayini.pdf.

Applying Model Management to Classical Meta Data Problems, [online]; [retrieved on Aug. 20, 2008]; retrieved from the Internet http://research.microsoft.com/~philbe/PBernsteinCIDR12ext.pdf.

Model Management 2.0: Manipulating Richer Mappings, [online]; [retrieved on Aug. 20, 2008]; retrieved from the Internet http://research.microsoft.com/~philbe/SIGMOD2007keynote.pdf.

Main Page—BioSQL, [online]; [retrieved on Aug. 20, 2008]; retrieved from the Internet Http://www.biosql.org/wiki/Main_Page.

Theoretical Aspects of Schema Merging, [online]; [retrieved on Aug. 20, 2008]; retrieved form the Internet http://repository.upenn.edu/cgi/viewcontent.cgi?article=1350&context=cis_reports.

Semi-Automatic Schema Integration in Clio, [online]; [retrieved on Aug. 20, 2008]; retrieved from the Internet http://www.vldb.org/conf/2007/papers/demo/p1326-chiticariu.pdf.

GUS: The Genomics Unified Schema, [online]; [retrieved on Aug. 20, 2008]; retrieved from the Internet http://www.gusdb.org.

Clio Grows Up: From Research Prototype to Industrial Tool, [online]; [retrieved on Aug. 20, 2008]; retrieved form the Internet http://www.dit.unitn.it/~p2p/RelatedWork/Matching/clio-industrial.pdf.

Data Integration: A Theoretical Perspective, [online]; [retrieved on Aug. 20, 2008]; retrieved from the Internet http://www.cs.ubc.ca/~rap/teaching/534a/readings/Lienzerini-pods02.pdf.

The Amalgam Schema and Data Integration Test Suite, [online]; [retrieved on Aug. 20, 2008]; retrieved from the Internet http://queens.db.toronto.edu/~miller/amalgam/.

The Use of Information Capacity in Schema Integration and Translation, [online]; [retrieved on Aug. 20, 2008]; retrieved from the Internet http://www.vldb.org/conf/1993/P120.PDF.

The MONDIAL Database, [online]; [retrieved on Aug. 20, 2008]; retrieved from the Internet http://www.dbis.informatik.uni-goettingen.de/Mondial.

PROMPT: Algorithm and Tool for Automated Ontology Merging and Alignment, [online]; [retrieved on Aug. 20, 2008]; retrieved from the Internet http://dit.unitn.it/~p2p/RelatedWork/Matching/SMI-2000-0831.pdf.

Translating Web Data, [online]; [retrieved on Aug. 20, 2008]; retrieved form the Internet http://www.almaden.ibm.com/cs/people/fagin/vldb02.pdf.

Merging Models Based on Given Correspondence, [online]; [retrieved on Aug. 20, 2008]; retrieved from the Internet http://research.microsoft.com/users/philbe/VLDB2003_Pottinger.pdf.

Schema Merging and Mapping Creation for Relational Sources, [online]; [retrieved on Aug. 20, 2008]; retrieved from the Internet http://www.cs.ubc.ca/~rap/publications/pottinger-bernstein-edbt08.pdf.

A Survey of Approaches to Automatic Schema Matching, [online]; [retrieved on Aug. 20, 2008]; retrieved form the Internet http://research.microsoft.com/~philbe/VLDBJ-Dec2001.pdf.

View Integration: A Step Forward in Solving Structural Conflicts, [online]; [retrieved on Aug. 20, 2008]; retrieved from the Internet http://cs.ubc.ca/~rap/teaching/534a/readings/TKDE94.pdf.

FCA—Merge: Bottom-Up Merging of Ontologies, [online]; [retrieved on Aug. 20, 2008]; retrieved from the Internet http://osm.cs.byu.edu/CS652s04/SM01FCA-Merge.pdf.

Leveraging Data and Structure in Ontology Integration, [online]; [retrieved on Aug. 20, 2008]; retrieved from the Internet http://www.cd.umd.edu/projects/linqs/iliads/p449.pdf.

Schema Mappings, Data Exchange, and Metadata Management, [online]; [retrieved on Aug. 20, 2008]; retrieved form the Internet http://www.dit.unitn.it/~p2p/RelatedWork/Matching/p61-Kolaitis.pdf.

Data Exchange: Getting to the Core, [online]; [retrieved on Aug. 20, 2008]; retrieved from the Internet http://www.almaden.ibm.com/cs/people/fagin/tods05a.pdf.

* cited by examiner

50

---

ApplyAssignment($G, X$)

Input: Matching graph $G = (V, \underline{\text{HasA}}, E)$. Boolean assignment $X$ for $E$.
Output: Integrated concept graph $G' = (V', \underline{\text{HasA}}')$, mapping $\mathcal{M}$ between source and integrated concept graphs.
Let $E_X$ be the subset of edges that have been assigned the value 1.

1. Create the integrated concepts.

(a) Compute the connected components in the graph $G_X = (V, E_X)$.

(b) For every connected component $[A_1, \ldots, A_k]$ of $G_X$, where $A_1, \ldots, A_k$ are concepts in $V$, create an integrated concept $C$ (i.e., a node in $V'$). Let $\underline{\text{att}}(C)$ be the union of the attributes in $A_1, \ldots, A_k$, where corresponding attributes are considered duplicates and are represented only once.
    For every $A_i$ among $A_1, \ldots, A_k$, define $f_X(A_i) = C$. Furthermore, for every attribute $a$ of $A_i$, define $f_X(A_i.a) = C.a*$, where $a*$ is the representative for the group of duplicates of $a$.

2. Construct $\underline{\text{HasA}}$ edges between integrated concepts. For every $A$ $\underline{\text{HasA}}$ $B$ $[L]$ in $G$, create $f_X(A)$ $\underline{\text{HasA}}$ $f_X(B)$ $[L]$ in $G'$ (i.e., an edge in $\underline{\text{HasA}}'$) and define $f_X(A\ \underline{\text{HasA}}\ B\ [L]) = f_X(A)\ \underline{\text{HasA}}\ f_X(B)\ [L]$.

3. [*Interactive*] Merging of parallel $\underline{\text{HasA}}$ edges and removal of $\underline{\text{HasA}}$ loops in $G'$. Affects $f_X$.

4. Create mapping $\mathcal{M} = \text{MapGen}(G, G', f_X)$.

MapGen($G$, $G'$, $f$)

Input: Matching graph $G = (V, \underline{\text{HasA}}, E)$, integrated concept graph $G' = (V', \underline{\text{HasA}'})$, and integration function $f$.
Output: Mapping $\mathcal{M}$ from $G$ to $G'$.
For every source concept $C$ of $G$ do:

1. Initialize $\mathcal{M}_C$ to be $$\underline{\text{for}}\ c\ \underline{\text{in}}\ C\ \underline{\text{exists}}\ c'\ \underline{\text{in}}\ C'\ \underline{\text{where}}\ \bigwedge_{a \in \underline{\text{att}}(C)} (c.a = c'.a^*),$$

provided that $f(C) = C'$ and $f(C.a) = C'.a^*$, for each $a \in \underline{\text{att}}(C)$.
   Initialize queue $Q = \{(c\ \underline{\text{in}}\ C, c'\ \underline{\text{in}}\ C')\}$.

2. Extend $\mathcal{M}_C$ by doing a "parallel chase" with $\underline{\text{HasA}}$ edges starting from $C$. Repeat steps (a)–(b) until $Q$ is empty.

(a) Take out $(u\ \underline{\text{in}}\ C_i, u'\ \underline{\text{in}}\ C'_i)$ from the first position in $Q$.

(b) For every edge $C_i\ \underline{\text{HasA}}\ C_j\ [L]$ do:

- Let $f(C_i\ \underline{\text{HasA}}\ C_j\ [L]) = C'_i \xrightarrow{L_1} D_1 \xrightarrow{L_2} \ldots \xrightarrow{L_n} C'_j$.
   - Chase $u\ \underline{\text{in}}\ C_i$ of $\mathcal{M}_C$ with the edge $C_i\ \underline{\text{HasA}}\ C_j\ [L]$ by adding, in the $\underline{\text{for}}$ clause, a new variable $w\ \underline{\text{in}}\ C_j$ and join condition $u\ \underline{\text{HasA}}\ w\ [L]$.
   - If $n > 0$, chase $u'\ \underline{\text{in}}\ C'_i$ of $\mathcal{M}_C$ with the path $C'_i \xrightarrow{L_1} D_1 \xrightarrow{L_2} \ldots \xrightarrow{L_n} C'_j$, by adding, in the $\underline{\text{exists}}$ clause, a sequence of variables $w_1\ \underline{\text{in}}\ D_1, \ldots, w_n\ \underline{\text{in}}\ C'_j$, and join conditions $u'\ \underline{\text{HasA}}\ w_1\ [L_1], \ldots, w_{n-1}\ \underline{\text{HasA}}\ w_n\ [L_n]$.
   - If $n > 0$, add $\bigwedge_{b \in \underline{\text{att}}(C_j)} (w.b = w_n.b^*)$ to the $\underline{\text{where}}$ clause of $\mathcal{M}_C$, provided that $f(C_j.b) = C'_j.b^*$, for each $b \in \underline{\text{att}}(C_j)$. Otherwise ($n = 0$ and $C'_i = C'_j$), add $\bigwedge_{b \in \underline{\text{att}}(C_j)} (w.b = u'.b^*)$ to the $\underline{\text{where}}$ clause of $\mathcal{M}_C$, provided that $f(C_j.b) = C'_i.b^*$, for each $b \in \underline{\text{att}}(C_j)$.
   - Insert $(w\ \underline{\text{in}}\ C_j, w_n\ \underline{\text{in}}\ C'_j)$ (if $n > 0$) or $(w\ \underline{\text{in}}\ C_j, u\ \underline{\text{in}}\ C_i)$ (if $n = 0$) in $Q$.

Return $\mathcal{M} = \{\mathcal{M}_C \mid C \text{ is a source concept in } G\}$.

CH-Enum(G)

Input: Matching graph $G = (V, \text{HasA}, E)$
Output: Enumeration of all the distinct integrated graphs (together with their mappings) that can be obtained from $G$ via ApplyAssignment.

1. Compute all cycles of $G$ (considering only the edges in $E$).
2. Construct a set $\Gamma$ of Horn clauses as follows: for each cycle $C = x_1, \ldots, x_k$ of edges in $E$, add the following $k$ Horn clauses to $\Gamma$:

$$x_1 \wedge x_2 \wedge \ldots \wedge x_{k-1} \rightarrow x_k$$
$$x_2 \wedge x_3 \wedge \ldots \wedge x_k \rightarrow x_1$$
$$\ldots$$
$$x_k \wedge x_1 \wedge \ldots \wedge x_{k-2} \rightarrow x_{k-1}$$

3. [Creignou & Hébrard]: Generate all satisfying assignments $X$ of $\Gamma$.
4. For each assignment $X$, output the result of ApplyAssignment($G, X$).

| Integration Scenario | Input Schemas | Value Corresp. | Source Concepts | Matching Edges | Cycles | Initialize (sec) | Avg. time /schema (ms) | Integrated Schemas | Integrated schemas after adding the $n^{th}$ enumeration constraint | Enumeration Constraints Enforced | Redundancy Constraints |
|---|---|---|---|---|---|---|---|---|---|---|---|
| Genex | 2 | 31 | 13 | 6 | 0 | 0.014 | 4.80 | 64 | $1^{st} \Rightarrow 32; 3^{rd} \Rightarrow 8; 6^{th} \Rightarrow 1$ | 1 | 4 |
| GUS-BioSQL | 2 | 34 | 238 | 9 | 0 | 2.667 | 34.24 | 512 | $1^{st} \Rightarrow 8; 3^{rd} \Rightarrow 2; 4^{th} \Rightarrow 1$ | 0 | 6 |
| WBI-SAP | 2 | 46 | 22 | 7 | 0 | 1.125 | 8.29 | 128 | $2^{nd} \Rightarrow 8; 3^{rd} \Rightarrow 4; 5^{th} \Rightarrow 1$ | 1 | 4 |
| Mondial | 2 | 53 | 52 | 19 | 0 | 0.056 | 1.62 | >3000 | $7^{th} \Rightarrow 1024; 11^{th} \Rightarrow 64; 14^{th} \Rightarrow 8$ | 2 | 12 |
| Amalgam | 2 | 30 | 24 | 29 | 3486 | 92.089 | 4.83 | >3000 | $5^{th} \Rightarrow 250; 7^{th} \Rightarrow 10; 9^{th} \Rightarrow 1$ | 8 | 0 |
| DBLP | 2 | 18 | 14 | 12 | 10 | 0.008 | 27.74 | 1096 | $1^{st} \Rightarrow 144; 3^{rd} \Rightarrow 4; 4^{th} \Rightarrow 1$ | 1 | 1 |
| Amalgam-DBLP | 2 | 26 | 29 | 10 | 0 | 0.014 | 1.04 | 1024 | $1^{st} \Rightarrow 64; 2^{nd} \Rightarrow 8; 5^{th} \Rightarrow 1$ | 1 | 1 |
| Proj-Dept-Emp | 3 | 15 | 11 | 10 | 3 | 0.005 | 0.19 | 250 | $2^{nd} \Rightarrow 100; 3^{rd} \Rightarrow 20; 5^{th} \Rightarrow 2$ | 2 | 3 |

| Integration Scenario | Enumeration Constraints |
|---|---|
| GUS-BioSQL | Merge(BioEntry, GOTerm, GOSynonym, Gene, GeneSynonim, Term, TermSynonym)<br>Apply(GORelationship ↔ TermRelationship)<br>Apply(Taxon$_1$ ↔ Taxon$_2$)<br>Apply(TaxonName$_1$ ↔ TaxonName$_2$) |
| WBI-SAP | ¬Apply(Address ↔ SAP_Order)<br>Merge(Order, PaymentInformation, SAP_Order, SAP_OrderDateData)<br>Apply(OrderLineItem ↔ SAP_OrderLineItem)<br>Apply(Adjustment ↔ SAP_OrderLinePricing)<br>Apply(DeliverySchedule ↔ SAP_ScheduleLines) |
| Amalgam-DBLP | ¬Merge(masterthesis$_1$, phdthesis$_1$, author$_1$, techreport$_1$, book$_1$)<br>Merge(author$_1$, author$_2$, author$_3$, author$_4$)<br>Apply(article$_1$ ↔ article$_2$)<br>Apply(inproceedings$_1$ ↔ inproceedings$_2$)<br>Apply(book$_1$ ↔ book$_2$) |
| Proj-Dept-Emp | ¬Apply(dept$_1$ ↔ project$_2$)<br>¬Apply(project$_2$ ↔ dept$_3$)<br>Merge(emp$_1$, emp$_2$, emp$_3$)<br>Apply(dependent$_2$ ↔ dependent$_3$)<br>Merge(project$_1$, project$_2$, project$_3$) |

FIG. 13

INTERACTIVE GENERATION OF INTEGRATED SCHEMAS

STATEMENT REGARDING FEDERALLY SPONSORED RESEARCH OR DEVELOPMENT

This invention was made with Government support under Contract Nos. FA9550-07-1-0223 and FA9550-06-1-0226 awarded by the Air Force Office of Scientific Research. The Government has certain rights in the invention.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND

1. Field

This invention relates to schema integration, and particularly to methods, systems and computer program products for interactive generation of integrated schemas.

2. Description of Related Art

Schema integration is the problem of creating a unified target schema based on a set of existing source schemas that relate to each other via specified correspondences. The unified schema gives a standard representation of the data, thus offering a way to deal with the heterogeneity in the sources.

Schema integration requires a substantial amount of human feedback due to the many ways in which an integrated schema can be designed based on the set of source schemas and their correspondences. Current approaches do not offer a systematic way of exploring the design space of integrated schemas. Thus, currently, there is one resulting schema that is generated by the system, possibly after interaction with a user. A general drawback of the existing methods is that users cannot see and cannot evaluate the many different alternative integrated schemas that can potentially be better.

BRIEF SUMMARY

Exemplary embodiments include a method for schema integration, the method including recasting a first source schema into a first graph of concepts with HasA relationships, recasting a second source schema into a second graph of concepts with HasA relationships, identifying matching concepts in the first graph and the second graph based on correspondences between attributes of the concepts of the first and second graphs, producing an integrated schema, based on a fixed specification of matching concepts to merge, and generating a mapping from the first source schema to the integrated schema and from the second source schema to the integrated schema.

Additional exemplary embodiments include a method for schema integration including recasting a first source schema into a first graph of concepts with HasA relationships, recasting a second source schema into a second graph of concepts with HasA relationships, identifying matching concepts in the first graph and the second graph based on correspondences between attributes of the concepts and systematically determining alternative integrated schemas and associated mappings, based on identifying possible choices of matching concepts to merge.

Additional exemplary embodiments include a computer program product for schema integration, the computer program product including instructions for causing a computer to implement a method, the method including recasting a first source schema into a first graph of concepts with HasA relationships, recasting a second source schema into a second graph of concepts with HasA relationships, identifying matching concepts in the first graph and the second graph based on correspondences between attributes of the concepts of the first and second graphs, producing an integrated schema, based on a fixed specification of matching concepts to merge and generating a mapping from the first source schema to the integrated schema and from the second source schema to the integrated schema.

Further exemplary embodiments include a computer program product for schema integration, the computer program product including instructions for causing a computer to implement a method, the method including recasting a first source schema into a first graph of concepts with HasA relationships, recasting a second source schema into a second graph of concepts with HasA relationships, identifying matching concepts in the first graph and the second graph based on correspondences between attributes of the concepts and systematically determining alternative integrated schemas and associated mappings, based on identifying possible choices of matching concepts to merge.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

TECHNICAL EFFECTS

As a result of the summarized invention, technically we have achieved a solution which provides a space of candidate schemas that is precisely defined and explored. The user can visualize all the alternative design choices. For each alternative, the user can see the corresponding integrated schema. Furthermore, for each such schema, the mapping from the sources to the integrated schema is also generated by the system. Thus, the user can see how data in each the source schemas could be migrated into the candidate integrated schema. The methods systems and computer program products described herein provide: 1) adaptive enumeration of multiple interesting integrated schemas, and 2) easy-to-use capabilities for refining the enumerated schemas via user interaction. Furthermore, the methods, systems and computer program products described herein operate at a logical, conceptual level that abstracts away the physical details of relational or XML schemas and makes it easy to express user requirements. A set of two or more source schemas (describing data in a common domain) together with a set of correspondences that relate pairs of elements in these schemas are provided. Correspondences signify "semantically equivalent" elements in two schemas. They can be user-specified or discovered through schema matching techniques. Given such input (source schemas and correspondences), the enumeration approach generates many possible meaningful design choices for the integrated target schema. At the same time, for each choice of an integrated schema, the mapping that specifies how the data in each of the source schemas is to be transformed to the integrated schema is generated.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 illustrates an ApplyAssignment algorithm in accordance with exemplary embodiments;

FIG. 8 illustrates a MapGen algorithm, a mapping generation algorithm in accordance with exemplary embodiments;

FIG. 9 illustrates a CH-Enum algorithm for duplicate-free enumeration of assignments in accordance with exemplary embodiments;

FIG. 12 illustrates a chart that shows, for each case, the number of schemas, as well as the number of concepts, matching edges and cycles in the matching graph in accordance with exemplary embodiments;

FIG. 13 which illustrates a table of enumeration constraints used in experiments with real schema integration scenarios in accordance with exemplary embodiments.

Figure 1:
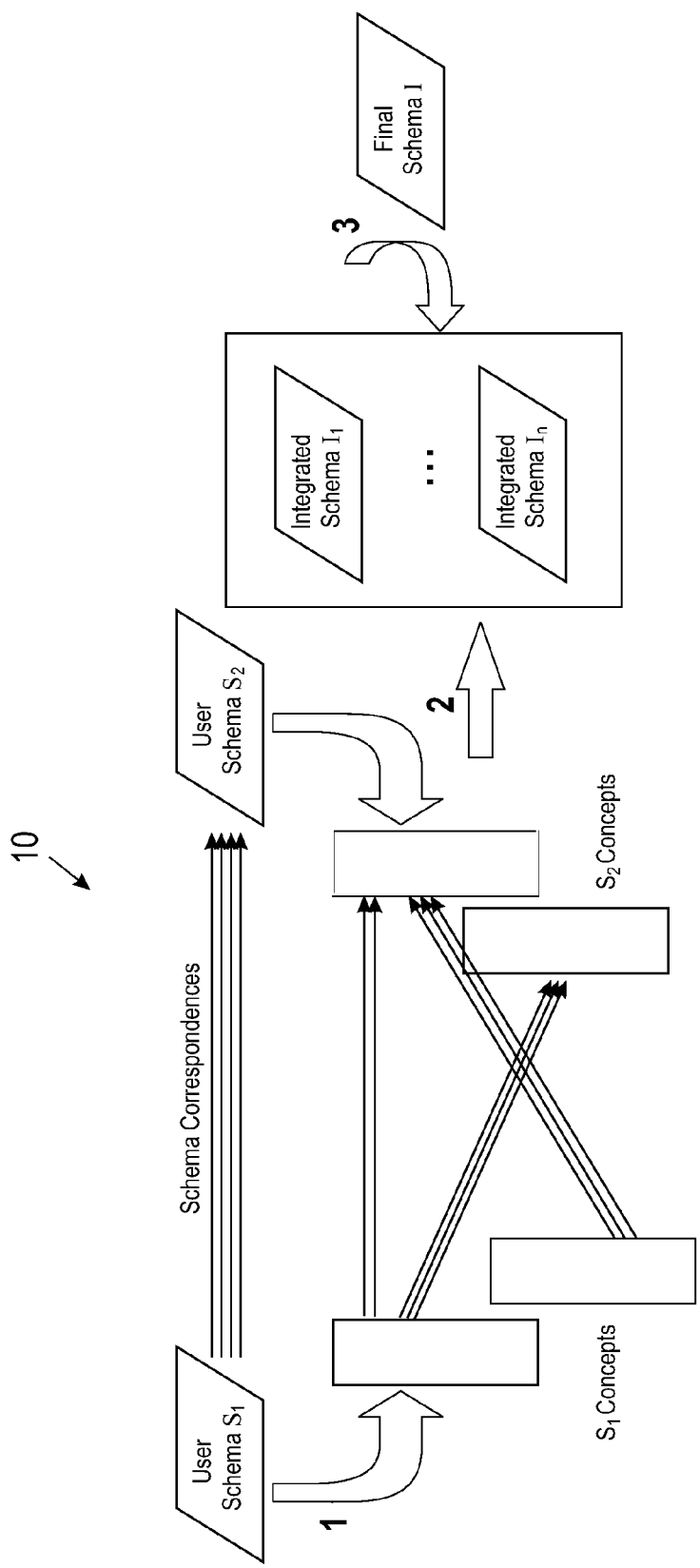
FIG. 1 illustrates a high-level overview block diagram depicting how a user can operate an integrated schema system is schematically, for the case of two source schemas.

The detailed description explains the preferred embodiments of the invention, together with advantages and features, by way of example with reference to the drawings.

DETAILED DESCRIPTION

Exemplary embodiments include methods, systems and computer program products that provide adaptive, user-driven enumeration of multiple integrated schemas of interest. The methods, systems and computer program products described herein operate by generating integrated schemas one by one, on demand. For each generated schema, the user can see the basic design choices that were made by the system. Then, the user can further alter these choices by imposing constraints on the design of the integrated schema. All the schemas that are subsequently generated by the system are guaranteed to satisfy the user constraints. The user constraints are natural and can be added at any step during the enumeration procedure. With each added user constraint, the space of candidate integrated schemas becomes smaller. This procedure repeats until the "best" schema (for a given domain) is generated.

In exemplary embodiments, the methods, systems and computer program products described herein operate at a logical level, where each source schema is recast into a graph of concepts with Has-A relationships. Matching concepts are then identified in different graphs by taking into account the correspondences between their attributes. For every pair of matching concepts, the pair is either merged into one integrated concept or retained as separate concepts.

In exemplary embodiments, there are two new algorithms implemented. First, an algorithm (Apply Assignment) is developed that, given a fixed choice of which concepts to merge and which not to merge, produces an integrated schema that preserves in a precise sense all the attributes and relationships of the source schemas. The algorithm includes an interactive feature that allows the users to specify how to merge redundant relationships. At the same time, the algorithm generates a mapping from the source schemas to the integrated schema that has precise information-preserving properties. As used herein, the term "algorithm" refers to a set of instructions for solving a problem, specifically on a computer.

Second, an enumeration algorithm (CH-Enum) is developed that can systematically output all possible integrated schemas (and the associated mappings), by considering all possible choices of which concepts to merge and which not to merge. An essential feature of the enumeration algorithm is that it avoids exploring different configurations that yield the same schema. This duplication-free algorithm makes use, as a subroutine, of a polynomial-delay algorithm for the enumeration of all Boolean vectors satisfying a set of Horn clauses. Furthermore, the enumeration algorithm is made adaptive and interactive, by incorporating user-specified constraints (also expressed as Horn clauses), so that only schemas that satisfy the constraints are subsequently generated.

FIG. 1 illustrates a high-level overview block diagram 10 depicting how a user can operate an integrated schema system is schematically, for the case of two source schemas. It is appreciated that the system can handle any number of source schemas, in general. For any number of source schemas, the architecture is the same except correspondences between multiple pairs of schemas are needed.

As an initial step 1, each source schema, with its constraints and nesting, is recast into a higher-level graph of concepts with HasA relationships. Each concept is essentially a relation name with an associated set of attributes. A concept intuitively represents one category of data (an entity type) that can exist according to a schema (e.g., "department", "employee", etc.). Concepts in a schema may have references to other concepts in the schema and these references are captured by HasA edges (e.g., "employee" contains a HasA reference to "department"). For the most part, subsequent integration operates at the higher level of abstraction that is offered by the concept graphs.

Next, matching concepts are identified in different graphs by taking into account correspondences between their attributes. For every pair of matching concepts there exists the alternative of merging them into one integrated concept or of leaving them as separate concepts.

In exemplary embodiments, for exploring the integrated schemas that result from the above choices (steps 2, 3), there can be three components that are developed. First, an algorithm for generating one integrated schema is applied, given a fixed choice of which matching concepts to merge. The space of candidate schemas via an enumeration procedure is then defined, which takes into account all possible merging choices (rather than a fixed one). This enumeration procedure provides the basis for more efficient and more directed ways of exploring the space of candidate schemas. In exemplary, one such directed method (our third component) is provided, which explores only a selected set of candidate schemas, interactively, based on user-specified constraints, ultimately leading to the desired integrated schema.

In exemplary embodiments, given a fixed choice of which concepts to merge, an algorithm (ApplyAssignment) is developed that produces a single integrated schema. This schema preserves, in a precise sense, all the attributes and relationships of the source schemas. The algorithm includes an interactive feature that allows the users to specify how to merge redundant relationships that may arise in the process. At the same time, the algorithm generates a mapping from the source schemas to the integrated schema that has precise information-preserving properties. The mapping generation component is in the spirit of the more general algorithms of mapping systems, which construct mappings between independently designed source and target schemas. However, the mapping algorithm described herein is more direct and has no ambiguity, by taking full advantage of how the integrated schema is generated from the source schemas.

In exemplary embodiments, an enumeration algorithm is developed that can systematically generate all possible integrated schemas (and the associated mappings), by considering all possible choices of which concepts to merge. In exemplary embodiments, the enumeration algorithm avoids exploring different configurations that yield the same schema. This duplication-free algorithm makes use, as a subroutine, of a polynomial-delay algorithm for the enumeration of all Boolean vectors satisfying a set of Horn clauses. In exemplary embodiments, polynomial-delay means that the delay between generating any two consecutive outputs (satisfying assignments in this case) is bounded by a polynomial in the size of the input. In exemplary embodiments, this result is desirable when the number of outputs is exponential in the size of the input.

In exemplary embodiments, the users do not need to see all the candidate schemas. Moreover, the methods, systems and computer program products described herein do not need to generate (a priori) all the candidate schemas. In exemplary embodiments, the full enumeration of all such schemas is not viable, even if duplicates are avoided. As such, an adaptation of the enumeration algorithm described above is devised so that schemas are generated on demand and in combination with user interaction. In exemplary embodiments, users can browse through the schemas that were generated so far and can also request the generation of the next integrated schema. In addition, users can specify constraints on the merging process itself, based on the schemas they have already seen. Although constraints are added primarily for semantic reasons (i.e., to incorporate the domain knowledge of the expert), they also have the benefit of greatly reducing the space of candidate schemas. In exemplary embodiments, each constraint can cut the space by as much as half. The result is an adaptive enumeration procedure that can quickly converge to a final integrated schema.

In exemplary embodiments, user constraints can be given through a visual interface, directly in terms of the concepts and of the matchings between the concepts. For example, the user can enforce a pair (or a group) of matching concepts to be always merged or never merged. Additionally, the user can give constraints that enforce the preservation of certain structural patterns in the input schemas. In exemplary embodiments, user interaction can narrow down the set of candidate schemas to a few relevant ones. Furthermore, the algorithm limits the time to generate the next schema. Thus, a user experiences only a small delay before seeing a different schema.

Figure 2:
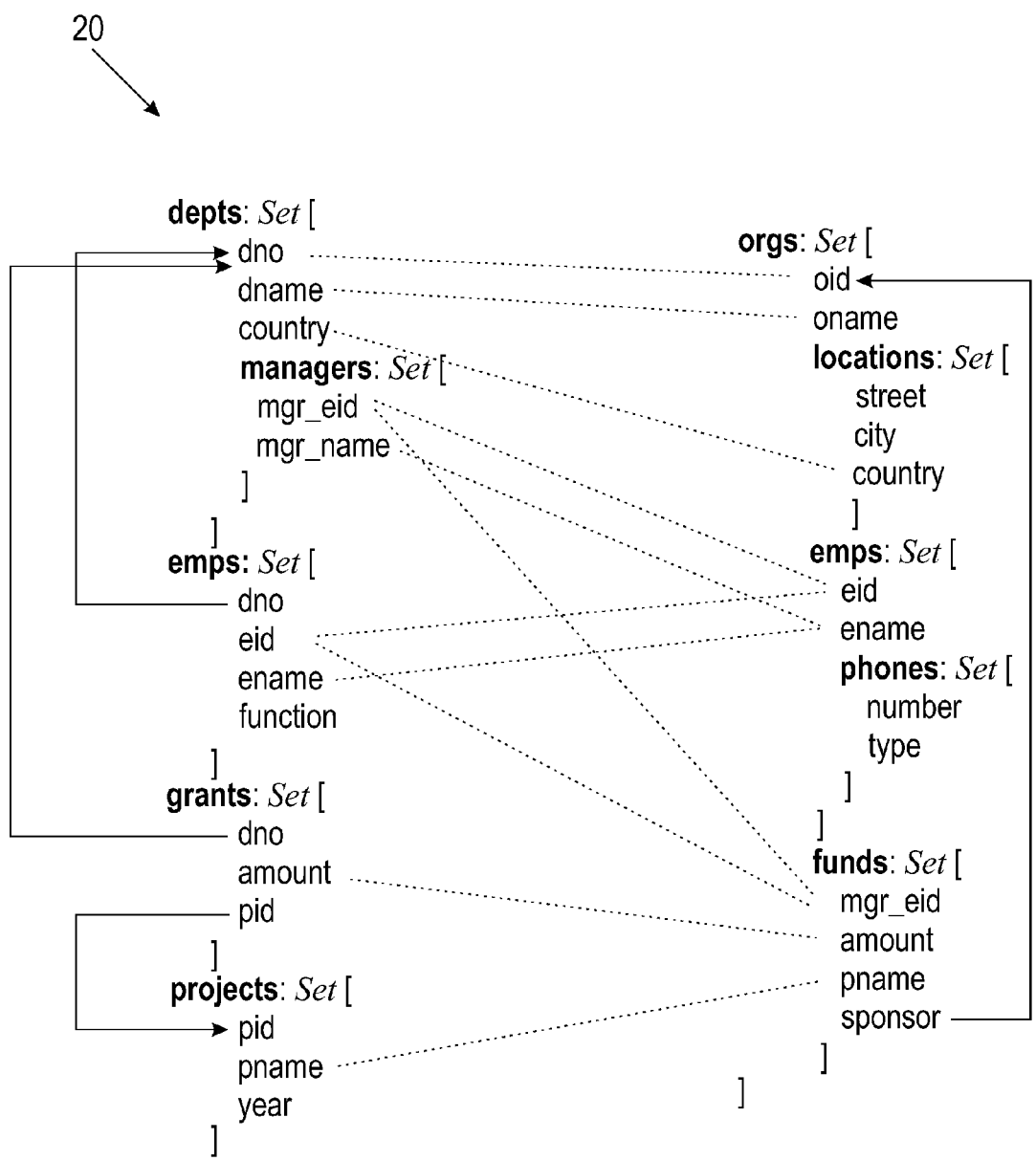
FIG. 2 illustrates an example of two schemas and their respective correspondences.

In exemplary embodiments, the methods, systems and computer program products described herein recast the schema integration problem into a problem of merging graphs of concepts. As such, certain schemas are implemented as input. FIG. 2 illustrates an example of two schemas S1 and S2 and their respective correspondences, both illustrated with label 20. The schemas are shown in a nested relational representation that is used as a common abstraction for both relational and XML schemas. This representation is based on nested sets and records. Formally, a nested relational schema consists of a set of labels (or roots), each with an associated set type Set $\tau$, where $\tau$ is defined by: $\tau::=b \mid [l1: \tau1, \ldots, ln : \tau n] \mid$ Set $\tau$. Here, b represents an atomic type such as string or integer, while $[l1:\tau1, \ldots, ln:\tau n]$ is a record type where $l1, \ldots, ln$ are labels (or elements). The definition is recursive and sets and records can nest in arbitrary ways. FIG. 2 does not show any of the atomic types (i.e., the types of the leaf-level elements), for simplicity. The term, attributes, is used for the atomic type elements. It is appreciated that attributes in a source schema are all assumed to have a unique identity (e.g., the full path in the schema, can be used for the purpose of identification). However, in examples, the name of the leaf-level element is used to refer to an attribute.

In exemplary embodiments, the first schema represents departments with their employees and grants, as well as the projects for which grants are awarded. The depts root is a set of department records, each with three atomic components and a set-valued component, managers, which represents a (nested) set of manager records. The arrows in schema S1 represent foreign key constraints: a grant has references to both a department and a project, while an employee has a reference to a department. The second schema includes a set of organization records with nested sets of locations, employees and funds. The information about managers has been condensed in this schema to one field (mgr eid in a fund record). Moreover, in this schema, employees have phones and each fund has a sponsoring organization (represented by a foreign key constraint) which may be different from the parent organization.

FIG. 2 also shows correspondences between atomic type elements (attributes) of the schemas S1 and S2. These correspondences are bi-directional and signify "equivalent" attributes (i.e., that can carry the same data) in the two schemas. They can be specified by the user or discovered through schema matching techniques. In exemplary embodiments, the correspondences between attributes are only considered, since these are the elements that carry actual data. In exemplary embodiments, there can be attributes with no correspondences and also attributes with multiple correspondences. For example, mgr eid in S1 matches both mgr eid and eid in S2 (possibly with less confidence for the second one; weights on correspondences are ignored for the examples and, instead, treat all correspondences the same).

In exemplary embodiments, n source schemas S1, . . . , Sn and a set of correspondences that relate pairs of attributes in these schemas are provided. The methods, systems and computer program products described herein compute an integrated target schema T and a set M of mappings from the source schemas to the integrated schema, such that T and M satisfy the following informal requirements:

(1) The integrated schema T is capable of representing all the atomic-type information in the source schemas, in the sense that every attribute occurring in S1, ..., Sn must be represented in T. However, it is possible that one target attribute may represent multiple source attributes that are "equivalent" according to the correspondences.

(2) The integrated schema T does not represent any extra atomic-type information not present in the sources, in the sense that every attribute of T must represent some attribute of S1, ..., Sn.

(3) Every tuple and every join of tuples that can be present in a source database conforming to a source schema is "transferred" via M into a similar tuple or join of tuples in the target. As such, the preservation of all the basic relationships that can exist in each of the sources can be required. The necessary notions are defined with respect to mapping generation component as described herein.

In exemplary embodiments, the concrete physical layout of schemas is abstracted into a more logical view that is based on concepts. Each schema (with constraints and with nesting) can be replaced by a graph of flat concepts where the edges represent HasA relationships. Formally, a concept graph can be defined (independently of a schema) as follows. U is fixed to be a universe of attributes. L is fixed to be a universe of labels (different from attributes).

In exemplary embodiments, a concept is a relation name C associated with a subset att(C) of U (these are the attributes of C). A concept graph is a pair (V,HasA) where V is a set of concepts and HasA is a set of directed edges between concepts, such that each edge has a label from L. A HasA B [L] is written whenever there is a HasA edge with label L from concept A to concept B.

In exemplary embodiments, the meaning behind A HasA B [L] is that every instance of concept A has a reference (of type L) to exactly one instance of concept B. The role of the HasA edges is to express that certain concepts cannot exist without other concepts (they extend or depend on those concepts). In exemplary embodiments, an edge A HasA B [L] can represent a many-to-one relationship from A to B: there can be zero or more A instances with references to the same B instance. In addition, there can be more than one HasA edge between two concepts and, moreover, the graph can have cycles.

Figure 3:
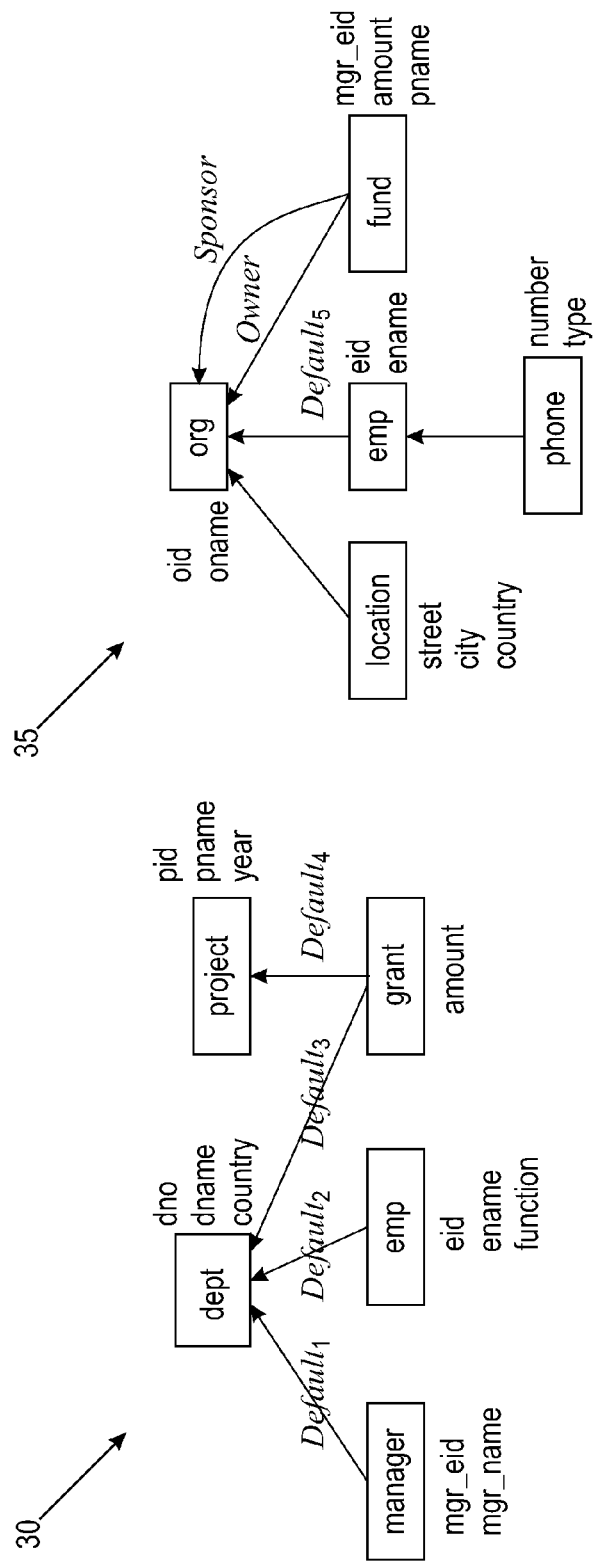
FIG. 3 illustrates two concept graphs that "correspond" to the of FIG. 2.

FIG. 3 illustrates two concept graphs 30, 35 that "correspond" to the schemas S1 and S2 of FIG. 2. Although each edge has a label (which is either system generated or given by the user), the label can be dropped whenever it is not important. In the case of parallel HasA edges, the labels are displayed in order to distinguish between them (see, for example, the two HasA edges labeled sponsor and owner in the second concept graph). For the concept graph of S1, dept and project are top-level concepts (i.e., have no outgoing HasA edges), corresponding to the top-level sets depts and projects. These are standalone concepts that do not depend on anything else. In contrast, there is a HasA edge from manager to dept, since a manager element cannot exist independently of a department (according to the nesting in S1). Similarly, there is a HasA edge from emp to dept, reflecting the fact that, in S1, an employee has a foreign key to a department. Also, grant has edges to both dept and project, since a grant has foreign keys into both department and project. In addition, the concept graph for S2 includes two parallel HasA edges from fund to org, reflecting the fact that a fund is nested under a parent organization (the "owner") and also a fund has a reference to a sponsoring organization (the "sponsor"). Thus, org plays a dual role with respect to fund.

In exemplary embodiments, concepts in one concept graph are not intended to represent absolute concepts. For example, location in the second concept graph in FIG. 3 represents the "location of an organization" and not a general notion of location. Similarly, emp represents the notion of an "employee within an organization" and not a general employee. Thus, concepts within one concept graph reflect a particular way of modeling the data. However, as schemas are integrated, concepts from different schemas can be merged and, thus, accumulate features (e.g., attributes and relationships) from the different schemas.

In exemplary embodiments, in order to extract the concepts and the relationships that are implicit in a schema, a simple algorithm is implemented, which creates one concept for each set-type element in the schema and then uses the structure and the constraints in the schema to establish the relationships (HasA edges) between concepts. In exemplary embodiments, for each set-type (collection) element S in the schema, a concept $C_S$ is computed such that: (1) $C_S$ includes all the attributes under S (without attributes from any other set type elements that may be nested under S), (2) $C_S$ has a HasA edge to the concept $C_{S1}$ encoding the parent collection S1 (if such parent exists), and (3) $C_S$ has a HasA edge to $C_{S2}$ whenever $C_S$ has an attribute that is a foreign key referring to one of the attributes (the key) of $C_{S2}$. Furthermore, whenever case (3) is applied, the foreign key attribute is dropped from the list of attributes of $C_S$ (since it is represented at $C_{S2}$). In both cases (2) and (3) a fresh label is computed for the HasA edge. In addition, case (3) applies also, without much change, when the foreign keys (and keys) are composite.

In exemplary embodiments, the concept graphs resulting from the two source schemas S1 and S2 are shown in FIG. 3. In exemplary embodiments, the name given to a concept or to a HasA edge is not essential. A possible choice for concepts is to generate a name based on the set-type element from which the concept is constructed. For HasA edges that are derived from foreign keys, the name of the foreign key attribute can be used. In addition, it may be necessary to keep track of the implicit mapping from a schema to its concept graph. In particular, for each concept, the set type element to which it corresponds is noted, and for each HasA edge, either the parent-child relationship or the foreign key constraint from which it was generated is also noted. This mapping is necessary to be able to translate any subsequent mappings that are expressed in terms of the concepts back in terms of the input schemas.

Finally, the algorithm described above can handle cyclic integrity constraints by transferring them into cycles over the HasA edges. For example, the resulting concept graph may include Dept HasA Emp [manager] and Emp HasA Dept [works_for].

In exemplary embodiments, once the extraction of concepts is achieved, most of the subsequent processing (including user interaction) is performed at the level of concepts and not schemas, which is beneficial since concepts are simpler and also reflect better the logical meaning behind the schemas. Nonetheless, once the concepts are integrated, an integrated schema can be created as further described herein. In addition, subsequent integration can take as input arbitrary concept graphs that are not necessarily the result of extraction from schemas. Thus, it can be applied directly to any logical models for as long as they can be expressed as concept graphs with HasA relationships.

In exemplary embodiments, the input correspondences that are given in terms of schemas are translated into "matching" edges between the concepts that correspond to the schemas. The result of this translation is a matching graph that is the main object of the subsequent processing (i.e., the actual merging and enumeration).

In exemplary embodiments, S1 and S2 are source schemas and C is a set of correspondences between attributes of S1 and S2. A is a concept of S1 and B is a concept of S2. A and B match if there is at least one attribute a in A and one attribute b in B such that there is a correspondence at the schema level between attribute a and attribute b. In exemplary embodiments, matching concepts are candidates for merging. In addition, the notion of a matching graph is defined, where the nodes are the concepts (in all the schemas) while the edges indicate matching concepts. Additionally, the matching graph also records the HasA edges, but is distinguished from the matching edges.

Furthermore, in exemplary embodiments, S1, ..., Sn are schemas and C is a set of correspondences between attributes of these schemas. In exemplary embodiments, the matching graph associated with S1, ..., Sn and C is an undirected graph G=(V, HasA, E) where:

The set V of nodes is the set of concepts of S1, ..., Sn;

The set HasA is the union of the sets of HasA edges obtained from the individual schemas;

The set E of edges contains exactly one edge for each pair of matching concepts in V.

Figure 4:
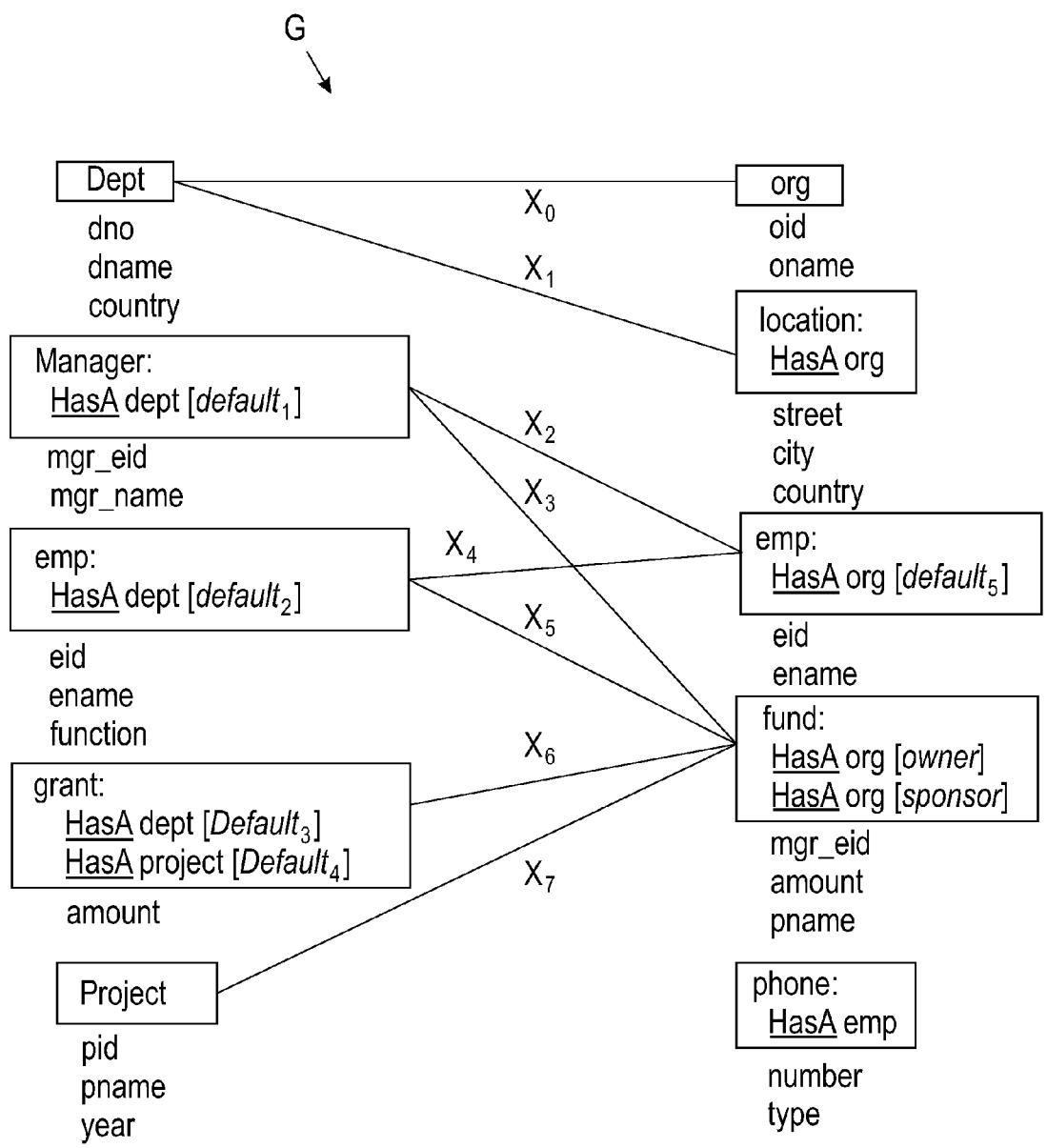
FIG. 4 illustrates a matching graph in accordance with exemplary embodiments.

FIG. 4 illustrates the matching graph G for the example. In exemplary embodiments, for two schemas, the matching graph is a bipartite graph. For simplicity, the HasA relationships are not shown as edges, to avoid cluttering, but instead are written as part of the concepts themselves. For example, a statement HasA dept is added to the manager concept definition to denote that there is a HasA edge from manager to dept. At this point, a HasA edge never relates concepts that come from different schemas. In FIG. 4, concepts are aligned in the two schemas so that matching concepts are close to each other. The layout used in FIG. 4 is similar to the way matching concepts are illustrated where specialized graph-displaying packages are used to help visualizing the matching.

Furthermore, the matching edges in the example are denoted as x0 to x7. In general, an edge x between concepts A and B may exist because of multiple pairs of attributes (a,b) that satisfy the conditions described above. For example, x0 exists due to the pairs (dno, oid) and (dname, oname). Nevertheless, only one edge is added between such concepts.

In exemplary embodiments, one concept may match with multiple concepts in other schemas. For example, dept matches with org but also with location, since the attribute country in dept has a correspondence to attribute country in location. A priori, it is not assumed that dept may match "better" with org than with location. It may happen that location is meant to represent a branch of an organization, and dept in the first schema also has the meaning of a branch, in which case dept matches better with location. As another example of multiple matchings, the concepts of manager and emp in the first schema match with both emp and fund in the second schema.

The enumeration algorithm described herein takes into account all choices of merging and explores all possible ways of integration. In addition, there may also be concepts that do not match with any concept. For example, phone is specific to the second schema. Even though they have no matches, such concepts are still involved in the merging process, since they may have HasA edges to other concepts.

In exemplary embodiments, different ways of merging the concepts can be obtained by considering different subsets of edges in the matching graph G. In exemplary embodiments, A and B are two matching concepts and x denotes the edge between these concepts in G. The edge x can have a value of 0 or 1: x=0 means that A and B need not be merged (i.e., the edge can be ignored), while x=1 means that A and B must be merged (i.e., the edge must be applied). Every Boolean assignment X to the set E of edges in G yields an integrated concept graph which in turn results in an integrated schema. The following are two assignments for the edges in the example:

X1: {x1=x2=x3=x5=0, x0=x4=x6=x7=1}
X2: {x0=x3=x5=0, x1=x2=x4=x6=x7=1}

In exemplary embodiments, the first assignment requires dept in the first schema to be merged with org in the second schema, emp in the first schema to be merged with emp in the second schema, and grant and project in the first schema to be merged with fund in the second schema. Under the second assignment, dept is merged with location, manager with the two emp concepts, and grant and project with fund. In exemplary embodiments, an assignment X can be identified with the subset $E_X$ of edges that have the value 1 under the assignment X.

In exemplary embodiments, an algorithm, ApplyAssignment, takes a matching graph and one assignment for the edges, and produces one integrated concept graph. In addition, the mapping is generated from the source concepts to the integrated concepts that specifies how source data has to be transformed into the integrated data. As further described herein multiple, distinct, integration results, are enumerated by repeatedly invoking Apply-Assignment on different assignments. FIG. 5 illustrates the ApplyAssignment algorithm 50.

At the high-level, the algorithm 50, applies first (in Step 1) all the mergings between concepts that are required by the input assignment. Step 2 creates HasA relationships among the integrated concepts, based on the source HasA relationships. The user is then allowed to refine the resulting integrated concept graph in Step 3. In the process, ApplyAssignment maintains an integration function $f_X$ (for the given assignment X) that specifies how each individual attribute, concept or HasA edge in a source concept graph relates to a corresponding attribute, concept, and, respectively, path of HasA edges, in the integrated concept graph. As further described herein, an integration function is used to construct the mapping between the source and integrated concept graphs in Step 4 of ApplyAssignment.

In exemplary embodiments, the connected components are computed in the graph $G_X=(V,E_X)$ that is induced from the matching graph G by considering only the edges in X with value 1. For each connected component, an integrated concept is obtained by taking the union of the attributes of the source concepts in that connected component, while at the same time collapsing duplicate attributes. Two attributes a and b of source concepts in a connected component are considered duplicates if: (1) there exists a correspondence between a and b at the schema level, or (2) there exists another attribute c of a source concept in the same connected component such that c is a duplicate of both a and b. For every group of duplicates, a representative is picked arbitrarily from the group that is subsequently used, in the integrated concept, in place of the individual attributes in the group. As a convention (to signify that a choice was made), the name of the representative is suffixed with "*", whenever there are at least two duplicates in the group.

Figure 6A:
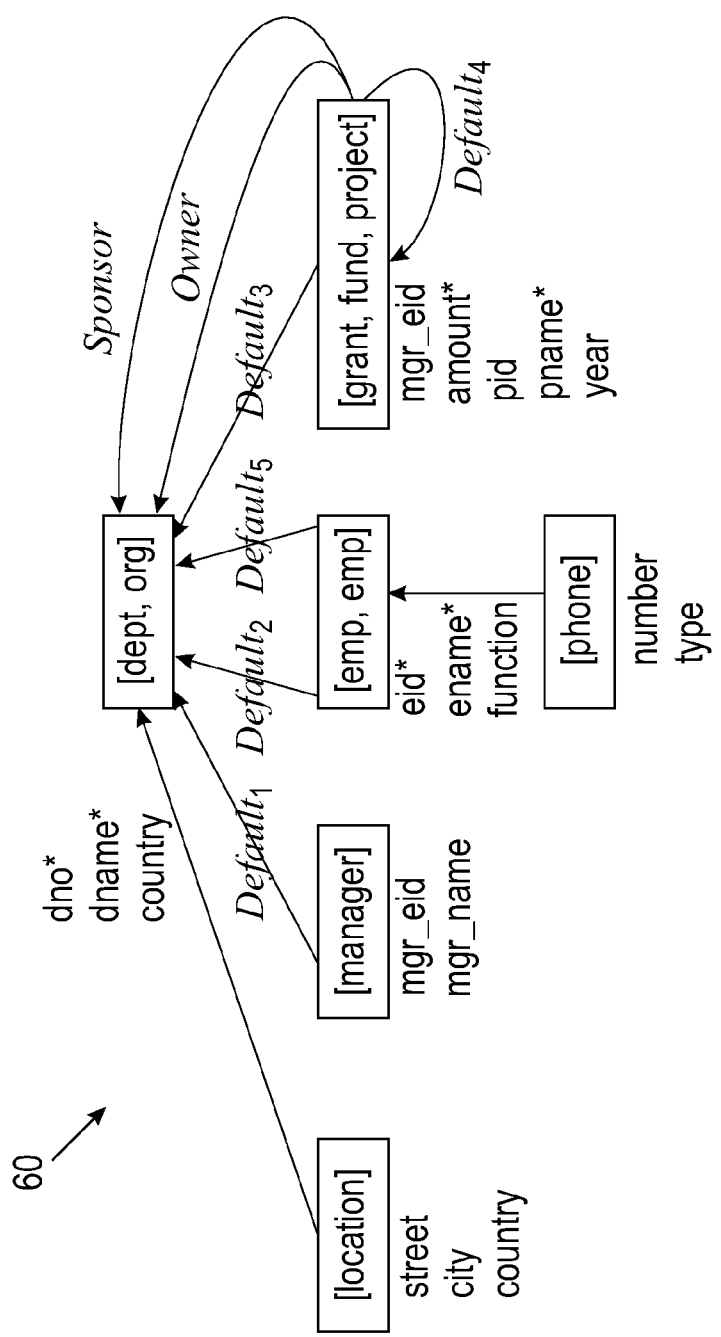
FIG. 6A illustrates a block diagram of integrated concepts in accordance with exemplary embodiments.

FIG. 6A illustrates a block diagram of the integrated concepts that result after Step 1 of ApplyAssignment, when given the earlier assignment X1. In exemplary embodiments, there are six integrated concepts, corresponding to the six connected components in the graph $G_{X1}=(V,E_{X1})$, where $E_{X1}=\{x0,x4,x6,x7\}$. For example, the integrated concept denoted as [dept, org] corresponds to the connected component consisting of the source concepts dept and org. The union of the attributes in dept and org is {dno, dname, country, oid, oname}. However, dno and oid are duplicates and are replaced by a unique occurrence of their representative (chosen as dno*). Similarly, dname and oname are replaced by the representative dname*.

In exemplary embodiments, the relationship between the source concepts and the integrated concepts is recorded via the integration function $f_X$. For illustrative purposes, f is written instead of $f_X$, if the assignment X is understood from the context. Concretely, each source concept C is mapped into the integrated concept that C is merged into. For example:

f(dept)=f(org)=[dept,org], f(location)=[location], f(grant)=f(project)=f(fund)=[grant,fund,project], . . .

In addition, each attribute of C is mapped into the representative attribute in f(C). For example:

f(dept.dno)=f(org.oid)=[dept,org].dno*,
f(dept.dname)=f(org.oname)=[dept,org].dname*,
f(location.country)=[location].country, . . .

In exemplary embodiments, Step 2 of ApplyAssignment (i.e., copying of relationships) "copies" all source HasA edges into HasA edges on the integrated concepts. Specifically, for each source relationship A HasA B [L], the edge f(A)HasA f(B)[L] is created between the integrated concepts f(A) and f(B). At the same time, the correspondence between the source HasA edge and the integrated one as f(A HasA B [L])=f(A) HasA f(B)[L] is recorded.

FIG. 6A shows the integrated concept graph resulting after Step 2 of the algorithm with assignment X1. In exemplary embodiments, every source HasA edge has a distinct corresponding HasA edge in the integrated graph. The integration function is now enriched with entries such as:

f(location HasA dept)=[location]HasA [dept,org]
f(emp1 HasA dept [default2])=[emp1, emp2]HasA [dept,org] [default2]
f(emp2 HasA org [default5])=[emp1, emp2]HasA [dept,org] [default5]

where emp1 is written for the emp concept in the first schema and emp2 is written for the emp concept in the second schema.

As a result of Step 2, the integrated graph may contain parallel HasA edges (see the edges between [emp1,emp2] and [dept,org]) as well as HasA loops (see the self-loop on [grant,fund,project]). In exemplary embodiments, parallel edges are considered different, since the relationships encoded by them are not necessarily the same. For example, the system may not automatically determine that the relationship between an employee and a department that is coming from the first schema is the same as the relationship between an employee and an organization that is coming from the second schema. Similarly, the system does not automatically remove loops: the relationship between the grant part of [grant, fund, project] and the project part of [grant, fund, project] that is now implicit in the fact that the two concepts have been merged may not be the same as the original source relationship between grant and project. It is appreciated that both may be needed, in which case the original edge is kept as a loop.

As such, it is appreciated that Step 2 of the algorithm includes, by default, all the HasA relationships between integrated concepts that can be derived from the source HasA relationships.

In exemplary embodiments, Step 3 of ApplyAssignment (i.e. removal of redundant relationships), enables the user to interactively merge parallel edges and remove loops in the integrated graph, whenever the user deems them as redundant. To represent the user feedback, a special form of constraints is implemented retains the information and re-applies the information in subsequent invocations of ApplyAssignment (for different assignments). Since these constraints are used to specify redundant information, they are referred to as redundancy constraints. These are constraints on the design of the integrated schema (and not constraints on the data).

Parallel HasA edges can be merged by using redundancy constraints of the form:

if f(A)=f(A'), f(B)=f(B')
then f(A HasA B [L])=f(A' HasA B' [L'])

where A HasA B [L] and A' HasA B' [L'] are two source HasA edges.

The meaning of such constraint is that, in any integrated graph where A and A' are merged (i.e., f(A)=f(A')) and B and B' are also merged (i.e., f(B)=f(B')), the two parallel HasA edges with labels L and L' that result in the integrated graph must be considered equal. In a sense, the constraint says that the two source relationships A HasA B [L] and A' HasA B' [L'] are equivalent, whenever the concepts involved in the relationships are merged, pairwise.

In exemplary embodiments, to enforce such constraint, one of the two parallel edges is removed. In exemplary embodiments, the first edge is removed in favor of the second. As a result of applying the constraint, the integration function f is also updated so that the two source edges map both into the surviving edge in the integrated graph.

Figure 6B:
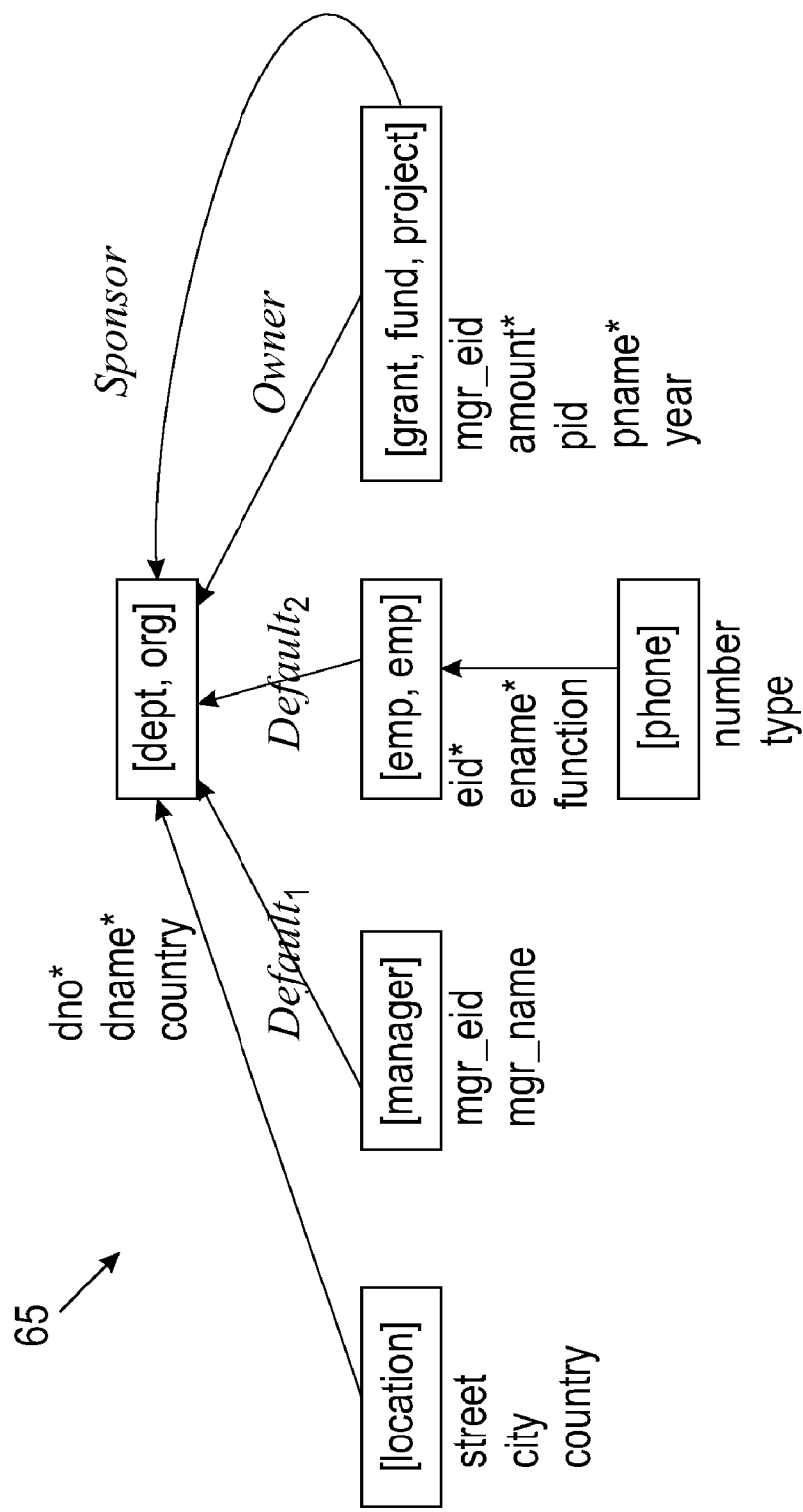
FIG. 6B illustrates the integrated concept graph in accordance with exemplary embodiments.

For the integrated concept graph in FIG. 6A, a user may state the following constraint:

(C1) if $f(emp_2)$=$f(emp_1)$, f(org)=f(dept)
then $f(emp_2$ HasA org $[default_5])$=$f(emp_1$ HasA dept $[default_2])$ to remove the edge from [emp1,emp2] to [dept,org] that is labeled $default_5$ in favor of the edge labeled $default_2$ (see FIG. 6B that illustrates the integrated concept graph after Step 3 of ApplyAssignment). A similar constraint can express the merging of the two parallel edges between [grant,fund,project] and [dept,org] that are labeled $default_3$ and owner into one edge labeled owner.

In exemplary embodiments, the constraints also apply in other integrated concept graphs, as long as the premises of the constraints are satisfied. For example, the system can generate, based on some other assignment, a different integrated graph where $emp_1$ and $emp_2$ are still merged (possibly with some other concepts, like manager), and where dept and org are still merged (possibly with some other concepts, like location). Then the user does not have to restate that $emp_1$ HasA dept and $emp_2$ HasA org are the same relationship.

In exemplary embodiments, loops in the integrated graph can be eliminated by means of redundancy constraints of a slightly simpler form:

if f(A)=f(B)
then f(A HasA B [L])=f(A)

In the above, A HasA B [L] is a source HasA edge. The meaning of the constraint is that, in any integrated graph where A and B are merged (i.e., f(A)=f(B)), the resulting loop f(A)HasAf(A)[L] is removed from the integrated graph, and the source HasA edge must be represented by f(A).

Based on the integrated concept graph in FIG. 6A a user may state the following constraint:

(C2) if f(grant)=f(project)
then f(grant HasA project [default4])=f(grant)

to remove the loop labeled $default_4$ (as in FIG. 6B). As a result, the relationship between grant data and project data is encoded directly within the integrated concept [grant,fund,project] (within one tuple). The integration function is changed accordingly so that the source HasA edge from grant to project is mapped into the single concept [grant,fund,project].

From a user interaction point of view, the constraints can be discovered by visualizing the parallel edges or loops that arise in an integrated concept graph. In the visual interface of the methods, systems and computer products described herein, the cause for such parallel edges or loops is traced back to the sources (via the integration function f). The user can then immediately state the "desired" constraints in terms of the source edges (e.g., state that two source edges are equivalent, or that one source edge should be collapsed whenever it becomes a loop). User constraints (i.e., redundancy constraints and enumeration constraints described herein) are a form of learning domain knowledge from a user. Once such knowledge is learned, it is automatically reapplied in other configurations, during the same run of the tool.

Figure 7:
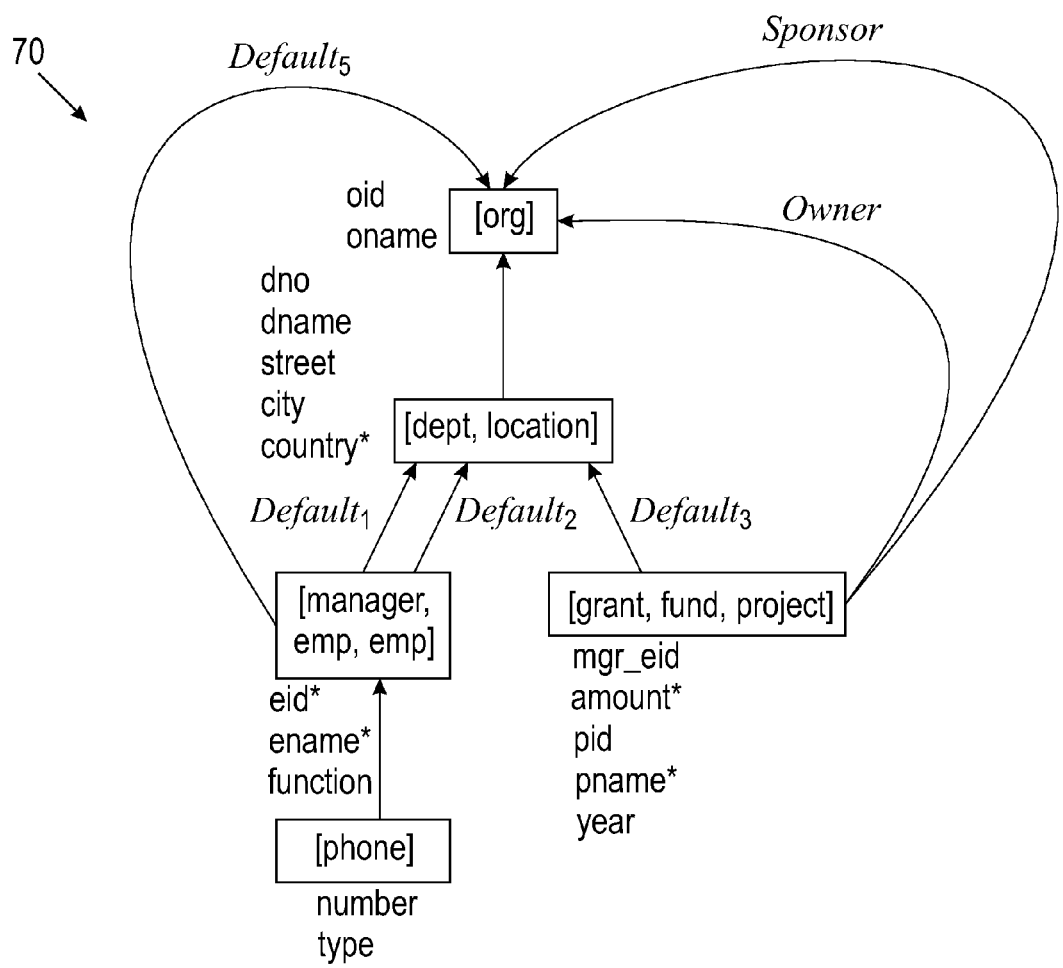
FIG. 7 illustrates diagram of another integrated concept graph in accordance with exemplary embodiments.

In exemplary embodiments, users specify constraints that map a source HasA edge into a path of zero, one or more HasA edges in the integrated concept graph. In the examples herein, a source HasA edge may be mapped into a path of length zero (e.g., C2) or of length one (e.g., C1). The following example illustrates a case where a source HasA edge needs to be mapped into a path of two edges in the integrated graph. For brevity, the notation A-$>^{L1}$ B-$>^{L2}$ C represents a path of edges A HasA B [L1] and B HasA C [L2]. FIG. 7 illustrates diagram 70 of another integrated concept graph in accordance with exemplary embodiments. The graph is obtained by ApplyAssignment when given the earlier assignment X2 (instead of X1) and the constraints described above. The following constraint:

if f(emp$_2$)=f(emp$_1$), f(dept)=f(location)
then f(emp$_2$ HasA org [default$_5$])=f(emp$_1$)→$^{default2}$ f(dept)→f(org)

implies that the edge from [manager,emp$_1$,emp$_2$] to [org] that is labeled default5 is made redundant by the path [manager, emp$_1$,emp$_2$]→$^{default2}$ [dept,location]→[org] and can be removed. The constraint asserts that, in general, whenever emp$_2$ and emp$_1$ are merged, and dept and location are merged, the source relationship emp$_2$ HasA org [default$_5$] is equivalent to the relationship implied by the two source edges emp$_1$ HasA dept [default$_2$] and location HasA org. In exemplary embodiments, the latter source edges are not in the same source schema and do not form a path. However, the condition f(dept)=f(location) in the premise of the constraint implies that their images (under f) form a path in the integrated graph.

FIG. 8 illustrates a MapGen algorithm 80, the mapping generation algorithm in accordance with exemplary embodiments. In exemplary embodiments, MapGen takes as input the matching graph G, the integrated concept graph G' and the integration function f resulting after Step 3 of ApplyAssignment, and outputs a mapping M between source and integrated concepts. Specifically, for every source concept C, a mapping M$_C$ in M is created, which specifies how an instance of C, together with all its relationships, is to be transformed into an instance (possibly associated with other instances) of an integrated concept C'. The mappings represent a logical specification of what the lower-level, executable, data migration code needs to implement.

Referring again to FIG. 6B, in Step 1 of MapGen, a mapping from one single source concept to one single integrated concept is constructed. The following is the mapping M$_{grant}$ constructed for the source concept grant:

for g in grant exists g' in [grant,fund,project]
where g.amount=g'.amount*

In exemplary embodiments, this assertion specifies that for each instance g of grant, there must exist an instance g' of [grant,fund,project] (which is f(grant)) where the value for the attribute amount* is copied from the source attribute amount (since f(grant.amount)=[grant,fund,project]. amount*).

In exemplary embodiments, Step 2 is the main component of MapGen and its role is to enrich the concept-to-concept mapping established in Step 1 so that it maps groups of related instances rather than isolated instances. In exemplary embodiments, according to the first source schema, a grant instance is associated with department and project information through the two HasA relationships labeled default$_3$ and default$_4$. In exemplary embodiments, it is desirable to carry over such data associations from the source and preserve them in the integrated data. Consequently, M$_{grant}$ is extended in Step 2 of MapGen in order to transfer, in the integrated data, all the instances that are directly or transitively associated with a grant instance. In exemplary embodiments, this extension is done by a parallel chase in both the for and exists clauses of the mapping, by recursively joining in all the concepts that are related via HasA relationships. At the same time, the mapping is extended on the joined concepts by using the function f.

In exemplary embodiments, in one iteration of Step 2(b) described above in FIG. 8, for the edge grant HasA dept [default$_3$], the following updated mapping is obtained:

for g in grant, d in dept; g HasA d [default$_3$]
exists g' in [grant,fund,project], d' in [dept,org]; g' HasA d'[owner],
where g.amount=g'.amount*and d.dno=d'no* and
d.dname=d'.dname and d.country=d'.country In exemplary embodiments, the for clause is extended by adding a join with the dept concept. The notation g HasA d [default$_3$] expresses the join at the instance level between g (an instance of grant) and d (an instance of dept). In addition, a corresponding join is added in the exists clause. It is appreciated that f(grant HasA dept [default3])=[grant,fund, project] HasA[dept,org] [owner]. Based on the integration function, the where clause of M$_{grant}$ is added to all the equalities between the attributes of the instances d of dept and d' of [dept,org].

Next, in a second iteration of the same Step 2(b) of the algorithm described above in FIG. 8, M$_{grant}$ is extended along the default$_4$ relationship as follows:

for g in grant, d in dept, p in project; g HasA d [default$_3$], g HasA p [default$_4$] exists g' in [grant,fund,project], d' in [dept, org]; g' HasA d' [owner],
where g.amount=g'.amount* and d.dno=d'.dno* and
d.dname=d'.dname* and d.country=d'.country and
p.pid=g'.pid and p.pname=g'.pname and p.year=g'.year It is appreciated that that f(grant HasAproject [default$_4$])= [grant, fund, project]. While the for clause is extended with a join with project on default$_4$, there is no need for such extension in the exists clause. The same instance g' of [grant,fund, project] that the grant instance g maps into is also used to map the associated project instance p. The equalities between the attributes of p and the corresponding attributes of g' (again, using f) are then added.

In the next two iterations of Step 2, the algorithm extends M$_{grant}$ along any HasA edges that may be outgoing from the dept and project instances that were added to the for clause. However, dept and project are top-level concepts without any such outgoing HasA edges. Hence, Step 2 finishes at this point and M$_{grant}$ is completed.

In exemplary embodiments, the parallel chase procedure described above does not terminate in the case of cyclic sets of constraints. To ensure that MapGen terminates (and outputs a finite mapping), a simple cycle detection condition is added that avoids further expansion based on HasA edges of concepts that have been expanded before. In exemplary embodiments, the parallel chase implemented here is a variation on a known chase technique. The chase in the for clause of the mapping is essentially the same as the standard chase. In exemplary embodiments, the chase is extended, in parallel, by using the function f, on the exists clause. Therefore, the mappings transfer all the relationships that can exist in the source into corresponding relationships on the integrated schema.

In exemplary embodiments, the mapping generation algorithm is directed by the function f computed in the ApplyAssignment algorithm. This function dictates which concepts map to which concepts and also dictates what join conditions to use, which is in contrast with more general mapping generation algorithms of schema mapping tools, which construct mappings between independently designed source and target schemas and, as such, have to consider all possible candidate mappings between all pairs of concepts, and with all possible choices of join conditions. The users of such systems would then have to specify which choices to actually use (e.g., a join on owner or one on sponsor). In exemplary embodiments, in the schema integration context described herein, the function f has already encoded in it which concepts and which joins to pick. Hence, mapping generation is more direct.

Although similar to the source-to-target tuple-generating dependencies used for schema-based mappings (i.e., mappings between relational, nested relational, or XML schemas), the mapping constraints described herein operate at the level of concept graphs rather than schemas. As such, they can potentially have a wider range of applications that go beyond schema-based integration (e.g., they could represent mappings between the objects in two different applications).

In exemplary embodiments, from an integrated concept graph, two types of integrated schemas can be generated: relational or nested (XML). In the relational version, each concept is implemented in a standard way, as a relation that includes all the attributes of the concept together with an additional key attribute. The HasA edges are then encoded by adding appropriate foreign keys in the concepts that have outgoing HasA edges.

In the nested version, each concept is implemented using a set-type of records containing the attributes of the concept, plus a key attribute. The set-types are then nested, by using the fact that a HasA edge represents a many-to-one relationship. In exemplary embodiments, if A HasA B [L], then there are zero or more instances of A that each have one reference (of type L) to one instance of B. This edge can be selected as an "anchor" for nesting: the A's are nested under B's by nesting the set-type element for A under the set-type element for B. The remaining HasA edges, not used for nesting, are then encoded through key/foreign key relationships (as in the relational case).

After creating the integrated schema, the final mapping from the input schemas to the integrated schema is then created. Although the mappings that are generated by MapGen are formulated in terms of concepts, translating such mappings back in terms of the concrete schemas (source and integrated) is straightforward. In exemplary embodiments, all the HasA joins have to be reformulated in terms of either parent-child navigation or key/foreign key joins (depending on how the relationships are encoded in the concrete schemas).

In exemplary embodiments, the generated mapping is used to generate the actual data transformation script (or view) from the sources to the integrated schema. Once the mappings are generated, we can apply any of the existing techniques for compiling the mappings into the run-time queries (e.g., XQuery, SQL, XSLT) that are needed to migrate the data can then be applied.

It is appreciated that the ApplyAssignment Algorithm 50 and the MapGen algorithm 80, have several main features. In exemplary embodiments, G=(V, HasA, E) is a matching graph and G'=(V', HasA') is the integrated graph produced by ApplyAssignment(G,X), for some assignment X to E. In addition, f is the integration function produced for X.

In exemplary embodiments, A is a source concept. Then for every attribute a of A there is an attribute a* in the integrated concept f(A) such that f(A.a)=f(A).a*. Conversely, let C be an integrated concept. Then for every attribute c of C there is some source concept A and some attribute a of A such that f(A.a)=C.c.

Furthermore, in exemplary embodiments, A HasA B [L] is a HasA edge in G. Then there is a path of zero or more HasA edges in G' such that f(A HasA B [L])=f(A)$\rightarrow^{L1}$ ... $\rightarrow^{Ln}$ f(B). Conversely, if C HasA D [L] is a HasA edge in G' then there is an edge A HasA B [L] in G such that f(A)=C, f(B)=D and f(A HasA B [L])=C HasA D [L].

In exemplary embodiments, I is a data instance for the graph of source concepts, and J is a data instance for the integrated concept graph that is generated by enforcing, in a canonical way, all the mapping constraints produced by MapGen. In addition, there are no cycles of HasA edges among the source concepts.

In exemplary embodiments, for every instance t in I of a source concept C, there is a corresponding instance t' of f(C) that is generated in J, such that for each attribute a of t, the value t.a equals t'.f(a). Moreover, whenever such t in I generates a corresponding t' in J, then for each instance u in I that t refers to (via a HasA edge) there is a corresponding instance u' that is generated in J. Furthermore, t' and u' are related in J by a path of HasA edges that corresponds (via f) to the HasA edge from t to u.

It is thus appreciated that the algorithms ApplyAssignment and MapGen work in a particular manner. In exemplary embodiments, all the attributes in source concepts are transferred to attributes of integrated concepts and, moreover, there are no "new" attributes in the integrated schema. Furthermore, in exemplary embodiments, all the HasA edges between the source concepts are transferred to paths of HasA edges in the integrated schema and, moreover, every HasA edge in the integrated schema comes from an edge (with the same label) in the source schema.

Finally, a stronger preservation property that holds at the data level, states that every instance t of a source concept maps to a corresponding integrated instance t'. Moreover, whenever such mapping of t into t' takes place, we also map all the instances related to t into instances related to t'.

In exemplary embodiments, the generation of a canonical integrated instance J based on the mapping constraints produced by MapGen is possible (and in polynomial time), which is due to the fact that the mappings themselves have no cyclicity. However, in the case of cycles of HasA edges among the source concepts, not all the relationships can be preserved. In particular, the paths of HasA edges between source instances can be of unbounded length. Some form of recursive mappings are needed to preserve such paths.

In exemplary embodiments, the methods, systems and computer program products described herein enumerate all possible assignments X that result in different integrated concept graphs. In exemplary embodiments, an enumeration algorithm is interactive and adaptive so that only a partial enumeration is needed.

In exemplary embodiments, as described above, different assignments (such as the earlier X1 and X2) encode different ways of merging the input concept graphs and therefore, may give different results for the integration. A naive enumeration algorithm would exhaustively go through $2^n$ Boolean combinations, if n is the size of X (i.e., the number of matching edges), and then, for each combination, would run the ApplyAssignment algorithm. Besides the potential infeasibility of enumerating a large number of combinations, the naive enumeration algorithm also has the drawback that there may be many assignments that give the same integrated schema (i.e., duplicate assignments). In exemplary embodiments, the methods, systems and computer program products described herein avoid, from the beginning, the enumeration of duplicate assignments. As a result, a significant portion of the space of assignments can be pruned.

It is appreciated that in current techniques, duplicates can arise in a naive enumeration algorithm. As described above, given an assignment X, Step 1 in the ApplyAssignment algorithm merges together all the source concepts that are connected by the edges selected by X. Thus, there is one integrated concept for each connected component in the subgraph of G induced by X. If one extra edge x in the set of edges that are selected by X, it is then possible that the effect of this extra edge x is subsumed by edges that are already selected by X. As such, x specifies that two concepts A and B should be merged but this merge is already a consequence of other selected edges (i.e., there is already a path of edges selected by X that connects A and B). Thus, applying the assignment X□{x} will result in the same configuration (same connected components) as applying X.

In exemplary embodiments, X and Y are duplicate assignments whenever the sets of connected components induced by X and Y, respectively, coincide. Duplicate assignments can result in duplicate integrated graphs. Furthermore, duplicate assignments always arise due to cycles in the matching graph G=(V,HasA,E). For example, in the earlier argument with the two duplicate assignments X and X □{x}, the extra edge x closes a cycle, since A and B are already connected by edges from X. If G has no cycles then there are no duplicate assignments.

Referring again to FIG. 5, the graph includes ten concepts, with eight matching edges, four of which form a cycle: x2, x4, x5, and x3. It can be seen that if an assignment contains any three edges along this cycle, then adding the fourth edge yields a duplicate assignment. Equivalently, if X is an assignment that contains all four edges in the cycle, then the following assignments are all duplicates of X: X-{x2}, X-{x4}, X-{x5}, X-{x3}. In exemplary embodiments, this duplication is independent of the assignments to the other edges (not in the cycle). Thus, for each of the $2^4=16$ (partial) assignments to the four edges not in the cycle, there are five assignments that have the same effect (thus, four of them are unnecessary). Accordingly, sixteen (partial assignments for edges not in the cycle)×4(duplicate partial assignments to edges in the cycle)=64 assignments that should not be considered (out of the $2^8=256$ total number of possible assignments) can be counted. This duplication is even higher if there are more edges outside the cycle. In addition, duplication happens in this example because of one cycle only.

In general, cycles appear more naturally and with higher frequency in n-way schema integration. In such scenarios, matching concepts will appear in multiple schemas. Furthermore, we may have mappings between multiple pairs of these schemas, thus easily forming cycles in the resulting graph of concepts. This increased number of cycles can result in an even larger number of duplicate assignments.

In exemplary embodiments, an algorithm for duplicate-free enumeration of assignments is a significant improvement over the naive enumeration algorithm. In addition, the algorithm for duplicate-free enumeration of assignments is adaptive, by taking user constraints into account, which further reduces the size of the space that actually needs to be explored.

In exemplary embodiments, the algorithm for duplicate-free enumeration of assignments avoids enumerating assignments that contain exactly k−1 of a cycle of length k in the matching graph. Each such assignment is a duplicate of the assignment obtained by adding the remaining k-th edge in the cycle. The "removal" of the assignments with k−1 edges is formalized by imposing a set of constraints that the assignments must satisfy. In exemplary embodiments, a Horn clause of the form:

$$x_1 \square x_2 \square \ldots \square x_{-1} \rightarrow x_k$$

is implemented to specify that every assignment that assigns 1 to $x_1, x_2, \ldots, x_{k-1}$ must also assign 1 to $x_k$. All "permutations" of such clauses are also taken into account for all the cycles in the matching graph.

In exemplary embodiments, the methods, systems and computer program products described here reduce the problem of duplicate-free enumeration of assignments needed in the schema integration context to the problem of enumerating all the satisfying assignments for a set of Horn clauses. Currently, a polynomial-delay algorithm addresses the latter problem. Polynomial-delay means that the delay until the first satisfying assignment is generated, and thereafter the delay between the generation of any two consecutive satisfying assignments, is bounded by a polynomial in the input size (i.e., the total size of the input Horn clauses), which formalizes the notion of a tractable algorithm for an enumeration problem with a possibly exponential set of outputs.

In exemplary embodiments, a CH-Enum algorithm 90 for duplicate-free enumeration of assignments (and the corresponding integrated concept graphs) is given in FIG. 9. In exemplary embodiments, the algorithm uses a polynomial-delay algorithm as a subroutine, but it is not itself a polynomial-delay algorithm, since, in the worst case, the number of cycles (and, hence, the number of Horn clauses) may be exponential in the size of the matching graph. As described above, the algorithm performs well on both synthetic and real-life integration scenarios, and clearly outperforms naive enumeration.

In exemplary embodiments, a Creignou & H'ebrard procedure is applied as shown in Step 3 in FIG. 9. In exemplary embodiments, Γ is a set of Horn clauses as above, and x1, . . . , xn are the variables that occur in Γ. Given such input, the Creignou & H'ebrard algorithm proceeds by recursively considering the variables x1, . . . , xn in order, as follows. Initially, all variables are unassigned. In step i (1≦i≦n), if the variable xi is unassigned, then its value is set first to 1. Otherwise, the variable already has a value (see next), and the algorithm continues with step i+1.

In exemplary embodiments, when xi is set to 1, some of the Horn clauses in Γ may now have all 1's in the left-hand side of the implication. For each such Horn clause, the algorithm propagates the value 1 to the variable in the right-hand side of the implication, in an attempt to satisfy the Horn clause. If the variable on the right-hand side is not already assigned a value of 0 (from a previous step), then it is set to 1 (if not already 1) and the process continues to the next step (i+1). Otherwise, the clause cannot be satisfied with the current partial assignment. As such, the branch with xi=1 is abandoned and the algorithm sets xi=0. The algorithm continues with step i+1.

Whenever a full assignment is found, it is output and the process backtracks to the last variable, xi, which was assigned 1. If no such xi exists, the process is complete. Otherwise, the variable xi is set to 0 and the process proceeds to explore, again, xi+1.

An advantage of the algorithm (over an exhaustive enumeration of satisfying assignments) is that as soon as a partial assignment is discovered to be unsatisfiable, none of its supersets are further considered. Hence, the algorithm prunes, early in the search, all the assignments that are guaranteed not to satisfy Γ.

In exemplary embodiments, the methods, systems and computer program products described herein do not enumerate all integrated schemas at once. In exemplary embodiments, target schemas are output one by one and the user is allowed to browse through the schemas generated so far, as well as request the generation of a new schema. As a result of this interaction, after examining a few integrated schemas, a user may gain more insight on the structure of the desired final schema. For example, the user may see things that are "wrong" and should be corrected. Based on this insight, the user can express additional constraints on how concepts should be merged. These constraints are then used to filter the set of schemas generated so far. In addition, the constraints can be incorporated in the enumeration of the subsequent schemas. The result is an adaptive enumeration procedure that significantly reduces the search space with every constraint that is learned from the user.

In exemplary embodiments, user constraints can be given through a visual interface, directly in terms of concepts or of the matching edges between them. In contrast to the redundancy constraints described above, which are applied to merge HasA edges between concepts, the presently defined constraints express conditions on how to merge the concepts themselves. Furthermore, these constraints directly affect the enumeration procedure, and are referred to as enumeration constraints.

In exemplary embodiments, the methods, systems and computer program products described herein implement two types of enumeration constraints. First, the user can require a matching edge x to be always applied or never applied, expressed as Apply(x) and respectively, ¬Apply(x). Whenever such constraint is applied, the space of possible assignments is reduced in half, since one variable is eliminated (set to either 1 or 0). Second, the user can require constraints of the form Merge(A1, ..., An) or ¬Merge(A1, ..., An), where A1, ..., An are arbitrary concepts in the matching graph (some could be from the same schema). These constraints also reduce, significantly, the space of possible assignments.

In exemplary embodiments, the meaning of ¬Merge(A1, ..., An) is that, for every pair of distinct concepts Ai and Aj, i,j□[1,n], Ai and Aj should never be merged. Thus, each Ai must be in a different connected component. Constraints of the form ¬Merge(A1, ..., An) are useful for enforcing certain structural patterns in the integrated schema. As an example, the user can add the constraint ¬Merge(org, location, emp, phone, fund) which essentially requires the structure of the second schema $S_2$ to be preserved. There is no merging among the five concepts, and their relative structure stays the same in the integrated schema. However, the concepts of the first schema can be freely merged into the concepts of the second schema, based on the matching edges.

In exemplary embodiments, for Merge(A1, ..., An), it may not be possible to merge all the n concepts, because there may not be enough matching edges. For example, Merge(dept, fund) cannot result in any merging, since there is no matching edge between dept and fund. In exemplary embodiments, the n concepts are grouped into connected components based on all the matching edges in the matching graph. If two concepts are in different components, no attempt is made to merge them. However, if two concepts are in the same connected component, only integrated graphs that keep them connected are enumerated. For example, the effect of Merge(dept, org, grant, fund, project) is that the subsequent enumeration shall only consider assignments that merge dept and org, and merge grant, fund, and project.

In exemplary embodiments, when a new enumeration constraint F is specified, the already generated schemas that do not satisfy F are filtered out. In addition, the CH-Enum algorithm is adapted so that it generates, from that point on, only schemas that satisfy F (and the other existing enumeration constraints). In exemplary embodiments, the enumeration constraints are encoded, whenever possible, with Horn clauses (similar to how cycles are encoded in CH-Enum).

In exemplary embodiments, if F is of type Apply(x), where x is a matching edge, the Horn clause→is added to the set of clauses that are considered by CH-Enum, to encode the fact that every assignment must satisfy x=1. In the implementation, if x is unassigned, then x=1, and the enumeration procedure continues. In exemplary embodiments, fixing the value of x means that x is never subsequently changed during the enumeration procedure. If x is currently assigned 1, then the enumeration continues until the point when x has to be switched from 1 to 0 (in the original Creignou & H'ebrard procedure). At this point, the switch is no longer done, x remains set to 1 and the process backtracks to the variable before x. If x is currently assigned 0, then x is set to 1 and the process backtracks to the variable before x. As such, any assignment that has x=0 is eliminated. Similarly, if F is of type ¬Apply(x), the Horn clause→¬x is added to encode the fact that every assignment must satisfy x=0. The implementation is similar (but complementary) to the case of Apply(x).

In exemplary embodiments, if F is of type ¬Merge(A1, ..., An), then for every two distinct concepts Ai and Aj, i,j □ [1,n], the constraint ¬Merge(Ai, Aj) is enforced as follows. For each simple path $x_1, ..., x_k$ between Ai and Aj in the matching graph, Horn clauses of the form $x_1$□ ... □$x_{k-1}$→¬$x_k$ are used (together with all the permutations). This process encodes the fact that every assignment that assigns 1 to any k−1 variables (edges) along the path $x_1, ..., x_k$ must assign 0 to the kth variable. As such, it is ensured that no path of edges connects Ai and Aj.

In exemplary embodiments, for the case of Merge(A1, ..., An), there can be no apparent way to encode such constraint, in general, as a set of Horn clauses. As such, in the implementation, the CH-Enum algorithm is not directed to avoid the generation of violating assignments. However, once an assignment is generated, it is checked whether it violates the constraint and then any such assignment is discarded. Although Merge constraints cannot be used to reduce the space explored by CH-Enum, they are still useful from the user interaction point of view.

EXAMPLES

The performance of the integration methods, systems and computer program products described herein are evaluated on synthetic schema integration scenarios, as well as on a few real world scenarios. The CH-Enum is much faster compared to the naive enumeration and that it scales well with the increasing complexity of schemas and mappings. In particular, the average time to output the next integrated schema, when using CH-Enum, is fairly low. Furthermore, experiments with enumeration constraints indicate that the space of candidate schemas drastically reduces after adding even a small number of constraints. The system is implemented in Java and all experiments are performed on a PC-compatible machine, with two 2.0 GHz P4 CPUs and 4 Gb RAM, running Linux and JRE 5.0.

Figure 10:
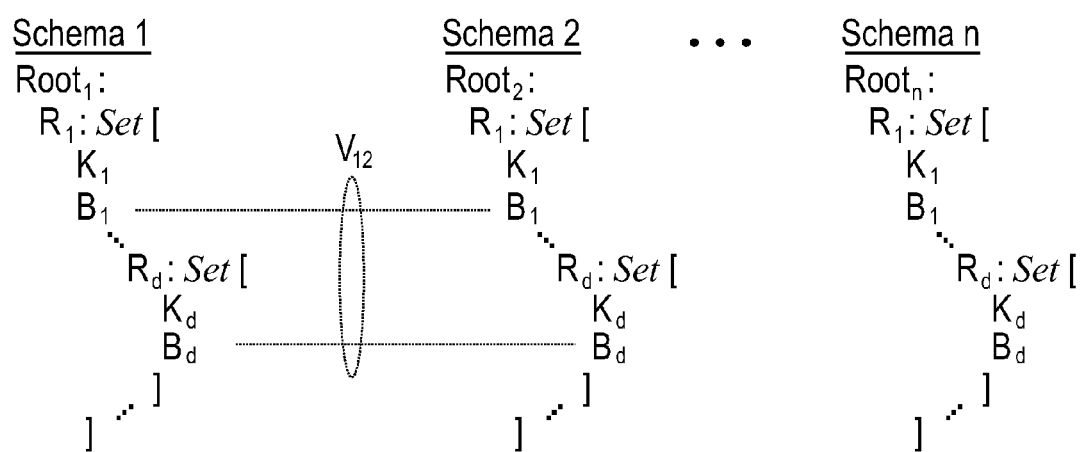
FIG. 10 illustrates a diagram of synthetic schema used in the synthetic experiments in accordance with exemplary embodiments.

The goal of the experiments with synthetic scenarios is to measure the performance of our integration method along three dimensions: 1) the number N of input schemas, 2) the complexity of each schema, measured by its root fanout F (i.e., the number of top level sets) and nesting depth D (i.e., the number of levels of nested sets), and 3) the degree I of interconnection between the input schemas. FIG. 10 illustrates a diagram 100 of synthetic schema used in the synthetic experiments, and shows N=n synthetic schemas with root fanout F=1 and nesting depth D=d, and a mapping that connects S1 and S2. Given input schemas Si and Sj, either Si and Sj are not connected, or they are connected through a set of correspondences Vij relating each attribute Bk of Si with the attribute Bk of Sj. For F=f, the configuration shown in FIG. 10 repeats f times (since there are f top-level sets in each schema). The degree I of interconnection between input schemas is the number of schemas Sj that are connected to an input schema Si, averaged over all input schemas.

Figure 11A:
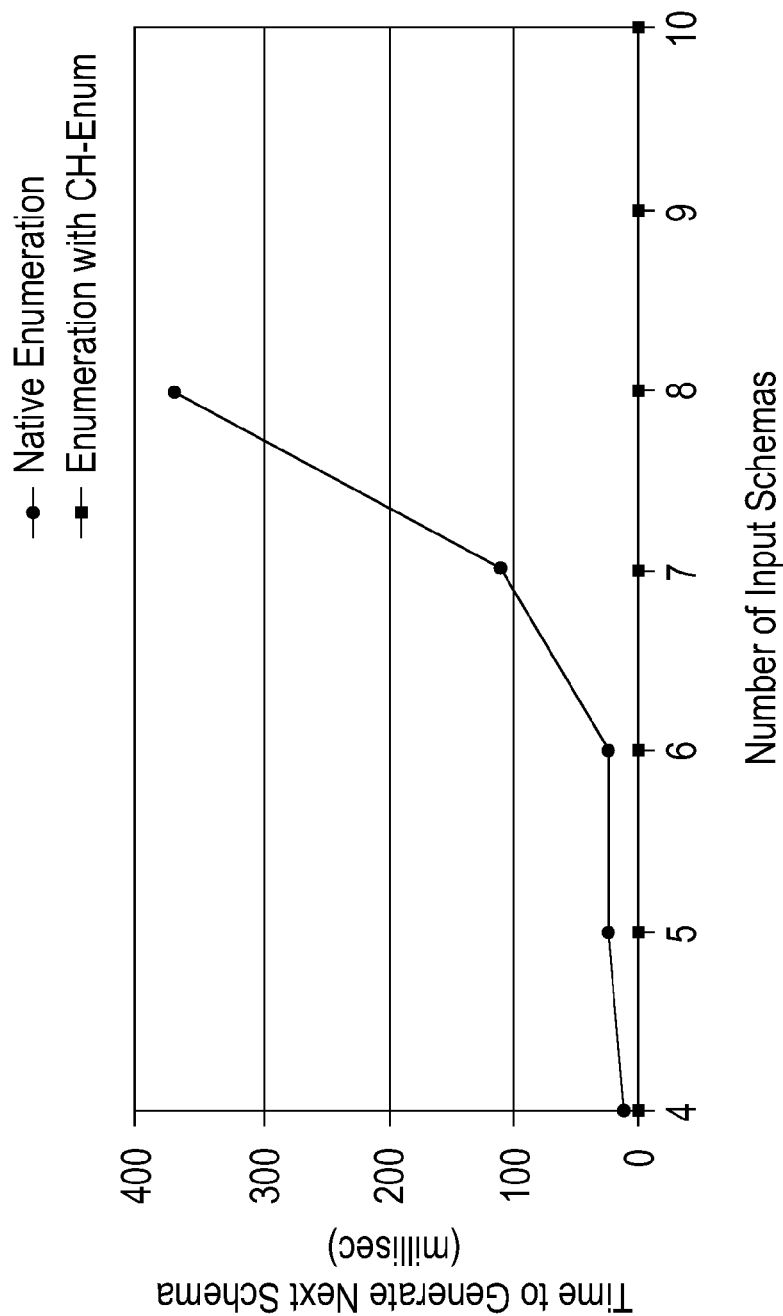
FIG. 11A illustrates a graph of a comparison in performance in accordance with exemplary embodiments.

FIG. 11A illustrates a graph 110 of a comparison in performance between the naive enumeration and CH-Enum. In the experiment, the degree of interconnection is fixed to I=3 (i.e., each input schema relates on average to three other schemas). The complexity of each schema was fixed to D=3 and F=1 and the number N of input schemas is varied from 4 to 10. The average time to generate the next integrated schema, for both strategies is reported. (In each scenario and for each strategy, no further generations were performed after the first 1000 integrated schemas.)

The results show that CH-Enum performs much better than the naive enumeration strategy. For example, in the scenario with N=8 CH-Enum took 2 milliseconds, on average, while the naive algorithm took around 370 milliseconds, to output the next integrated schema. The difference in performance is not unexpected, since the naive algorithm exhaustively enumerates all possible assignments, a large portion of which are duplicate assignments (i.e., leading to the same set of connected components in the matching graph). These duplicates are explicitly removed by checking whether the set of connected components generated in Step 1 of ApplyAssignment has already been encountered. The space needed to store the previously seen sets of connected components is in itself a problem. (In fact, for the scenarios with N=9 and N=10, the naive algorithm ran out of memory, which is why the times are not reported in FIG. 11A). To illustrate the savings obtained with CH-Enum, the scenario with N=4 is considered, where there are 3375 distinct integrated schemas. In this scenario, the matching graph consists of twelve concepts and eighteen matching edges, and has twenty one cycles. The naive enumeration strategy performs duplicate elimination on $2^{18}$ possible sets of connected components, while CH-Enum directly generates the 3375 distinct ones.

Figure 11B:
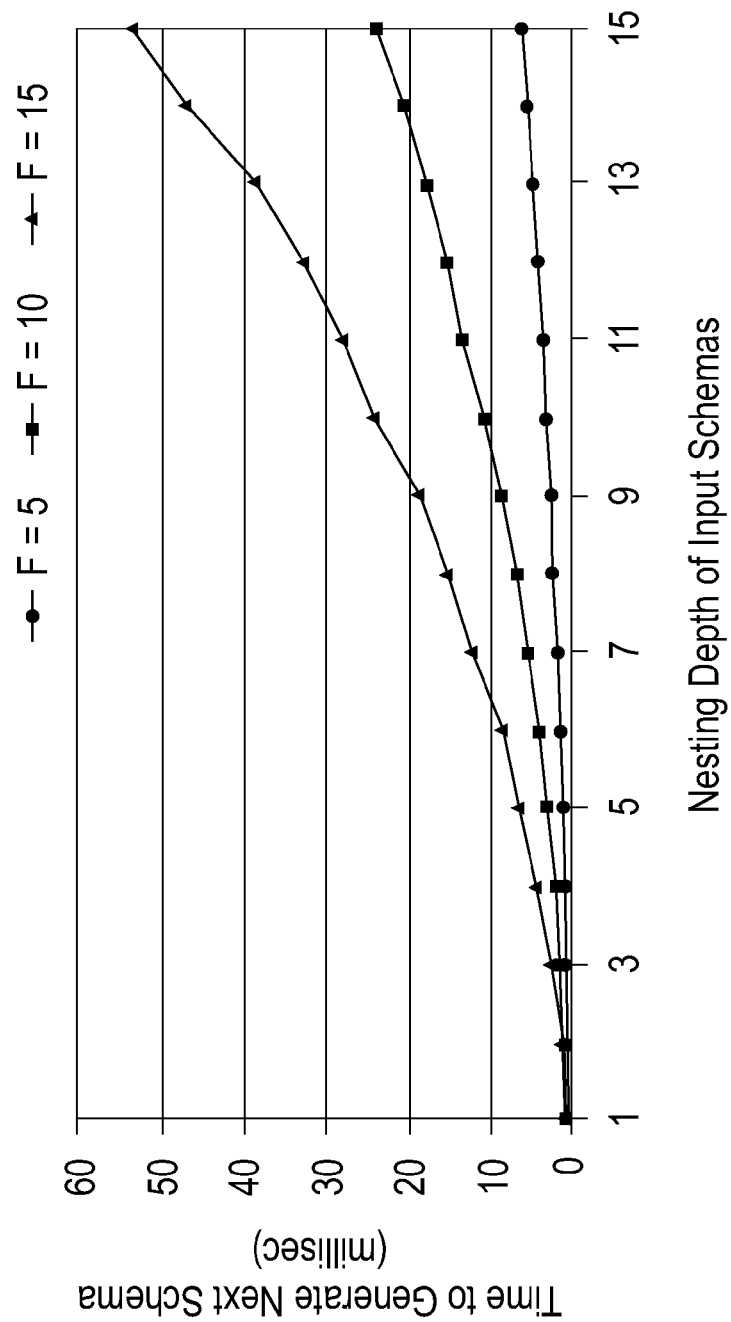
FIG. 11B illustrates a graph illustrating the influence of the root fanout (F) and the nesting depth (D) of the input schemas on the average time to output the next integrated schema in accordance with exemplary embodiments.

In a second experiment, the scalability of CH-Enum is tested with the complexity of the input schemas. Implicitly, this also tests the scalability of the ApplyAssignment algorithm, which is invoked to generate each integrated schema. Scenarios with two input schemas (i.e., N=2 and I=1) are used and generated the first 1000 integrated schemas. FIG. 11B illustrates a graph 115 illustrating the influence of the root fanout (F) and the nesting depth (D) of the input schemas on the average time to output the next integrated schema. As expected, the performance decreases with the increase in the complexity of the schemas.

The performance and usability of our method in several real-life integration scenarios is also tested. The schemas used in these scenarios are: a relational and an XML schema, each representing gene expression experimental results (GENEX); a fragment of the Genomics Unified Schema (GUS) and the BioSQL schema for genomic sequences and features; two XML schemas representing enterprise business objects related to orders, one from SAP and the other one in use with the IBM WebSphere Business Integration (WBI) suite; a relational and the DTD version of the Mondial database; two relational schemas from the Amalgam integration benchmark for bibliographic data; two variations of the XML schema for the DBLP bibliography; the first schema in the Amalgam benchmark and one of the previous DBLP schemas; and three XML schemas, each with a different nesting structure, representing information about departments, projects and employees. FIG. 12 illustrates a chart 120 that shows, for each case, the number of schemas, as well as the number of concepts, matching edges and cycles in the matching graph.

The running times for CH-Enum as well as the size of the space of candidate schemas in each scenario are also shown in FIG. 12. CH-Enum performed well in all cases, taking up to 35 milliseconds to generate the next integrated schema, on average. The size of the space of candidate schemas (shown in the Integrated Schemas column) may be large (around or above 1000 schemas in the cases of Mondial, Amalgam, DBLP, Amalgam-DBLP). However, the experiments with user constraints, show that the number of schemas that a user actually explores (and the tool generates) before arriving at the desired schema is much smaller.

The last three columns in FIG. 12 measure the user interaction effort in terms of the number of enumeration and redundancy constraints that need to be added. In the case of enumeration constraints, the impact that such constraints have on the overall convergence of the schema integration method is shown. Specifically, the space of remaining candidate schemas (i.e., the space of schemas that satisfy the enumeration constraints added so far and, hence, are of interest to the user) is significantly pruned after adding just a few enumeration constraints. In the DBLP scenario, for example, the number of schemas of interest is decreased from 1096 to 144 after adding the first constraint, then further decreased to four after the third constraint, and then decreased to just one after adding the fourth constraint. In FIG. 12, these facts are denoted as 1st☐144; 3rd☐4; 4th☐1.

To illustrate the enumeration constraints that were added, the following are the four enumeration constraints for the DBLP scenario: 1) do not merge concepts in the second DBLP schema (thus, the second DBLP schema is taken as a reference schema and the other schema is merged into it), 2) merge Article with Pub, 3) merge In-proceedings with Pub, and 4) merge Author (in the first schema) with Author (in the second schema). For Mondial, enumeration constraints to enforce the merging of matching concepts such as Sea, Mountain, Lake and others, occurring in the two schemas are used. As another example, just four enumeration constraints sufficed to reduce the space of candidate schemas to only two integrated schemas of interest in the WBI-SAP scenario. The enumeration constraints we have added in the WBI-SAP scenario, as well as in some of the other scenarios, are shown in FIG. 13 which illustrates a table 130 of enumeration constraints used in experiments with real schema integration scenarios.

In addition, the number of enumeration constraints required to prune the search space to a few schemas of interest can be seen as a pessimistic upper bound on the number of enumeration constraints that the user has to actually enforce in practice, because the methods, systems and computer program products described herein may generate and display the "right" integrated schema much earlier in the process. The reason for this behavior is that the implementation of the enumeration algorithm gives priority to the most merged candidate schemas, which are often what a user wants, provided that other constraints are satisfied. Thus, generating schemas from the most merged ones to the least merged ones (due to the fact that we explore assignments starting from all 1's down to all 0's) is quite beneficial in practice.

To illustrate this behavior, the second to last column in FIG. 12 shows the number of constraints we have actually enforced before the tool displays the right integrated schema, in each scenario. In the WBI-SAP scenario, for example, the desired integrated schema was generated and displayed after the first enumeration constraint is added, although five such constraints are (theoretically) necessary to reduce the search space to this integrated schema. In this scenario, as well as in several others (e.g., Genex, GUS-BioSQL, DBLP), most or all of the desired merging is performed by the methods, systems and computer program products described herein automatically, and the user needs to enforce at most one constraint to indicate, through ¬Apply and ¬Merge constraints, which merging choices are undesirable.

Furthermore, as shown in the last column, at most twelve redundancy constraints were needed, over all scenarios, to remove the redundant HasA edges in the integrated schema. As an example, in the DBLP scenario, only one redundancy constraint was needed to merge two parallel relationships "copied" from Author HasA Article and respectively, Author HasA Inproceedings. Finally, in the case of GUS-BioSQL, all that is needed is four enumeration constraints (at most) and six redundancy constraints to arrive at the merge of two complex schemas of real-life significance to biologists. A similar comment applies to the WBI-SAP scenario, where the input schemas are also quite complex (the concepts have tens of attributes) and are of real-life significance to enterprise applications.

Furthermore, the number of cycles in the matching graph impacts the initialization time of CH-Enum (i.e., the time to compute all cycles in Step 1). In the Amalgam scenario (the worst case), it takes 92 seconds to compute a total of 3,486 cycles. In general, a large number of cycles in the matching graph constitutes a potential problem for Step 1 of CH-Enum. In the implementation, a "hybrid" approach between the naive enumeration and CH-Enum that limits the number of cycles computed in Step 1, is used and checks for duplicate assignments as an extra step (since duplicate assignments may still appear due to cycles not found in Step 1). Thus, we bound the initialization time, at the expense of an increase in the time to generate the next schema.

The distinguishing feature of the methods, systems and computer program products described herein, when compared to existing work on schema integration, model merging, and ontology merging, is the systematic enumeration and exploration of the different integration designs. The enumeration of alternative designs is based on the recognition that correspondences between concepts signify overlap in semantics rather than equivalence, and therefore such concepts may or may not be merged, depending on the scenario. Current ontology integration techniques have been primarily focused on the problem of ontology alignment, which is deriving relationships across concepts in different ontologies. In contrast, the methods, systems and computer program products described herein explore the alternatives for the structural unification of the redundant concepts or attributes (i.e., the merge phase).

One of the more recent prior works on schema integration [Pottinger & Bernstein, 2003] makes use of a mapping "in the middle" that essentially drives the integration of the two input models. The mapping, which can be quite complex, can be seen as a "template" for the integrated model, and must be specified by a user before the actual integration. In contrast, the input to the methods, systems and computer program products described herein is just a set of atomic correspondences which can be discovered by an automatic schema matching tool. In exemplary embodiments, the additional user constraints are given as the user explores the available choices that the tool discovers (a "learn-as-you-go" approach, as opposed to knowing or guessing in advance what the outcome should be).

The methods, systems and computer program products described herein operate at a logical rather than physical schema level. A meta-meta-model includes HasA edges as the basic form of relationships, and a simpler form of Contains (i.e., concepts contain attributes). Nevertheless, the graphs of concepts can express most of the essential features that appear in schemas or in conceptual models such as ER diagrams or UML class diagrams.

The methods, systems and computer program products described herein, given a set of heterogeneous source schemas and correspondences between them, systematically enumerate multiple integrated schemas and, at the same time, support refining the enumerated schemas via user interaction. The methods, systems and computer program products described herein first formalize the problem in terms of concept graphs, reduce it to a graph-theoretic problem, and then take advantage of a known polynomial-delay algorithm for enumerating the satisfying assignments of Horn formulas.

The exemplary enumeration framework described herein also precisely defines the space of candidate schemas in the context of schema integration. The adaptive enumeration algorithm based on user constraints is one effective way of exploring this space.

Figure 14:
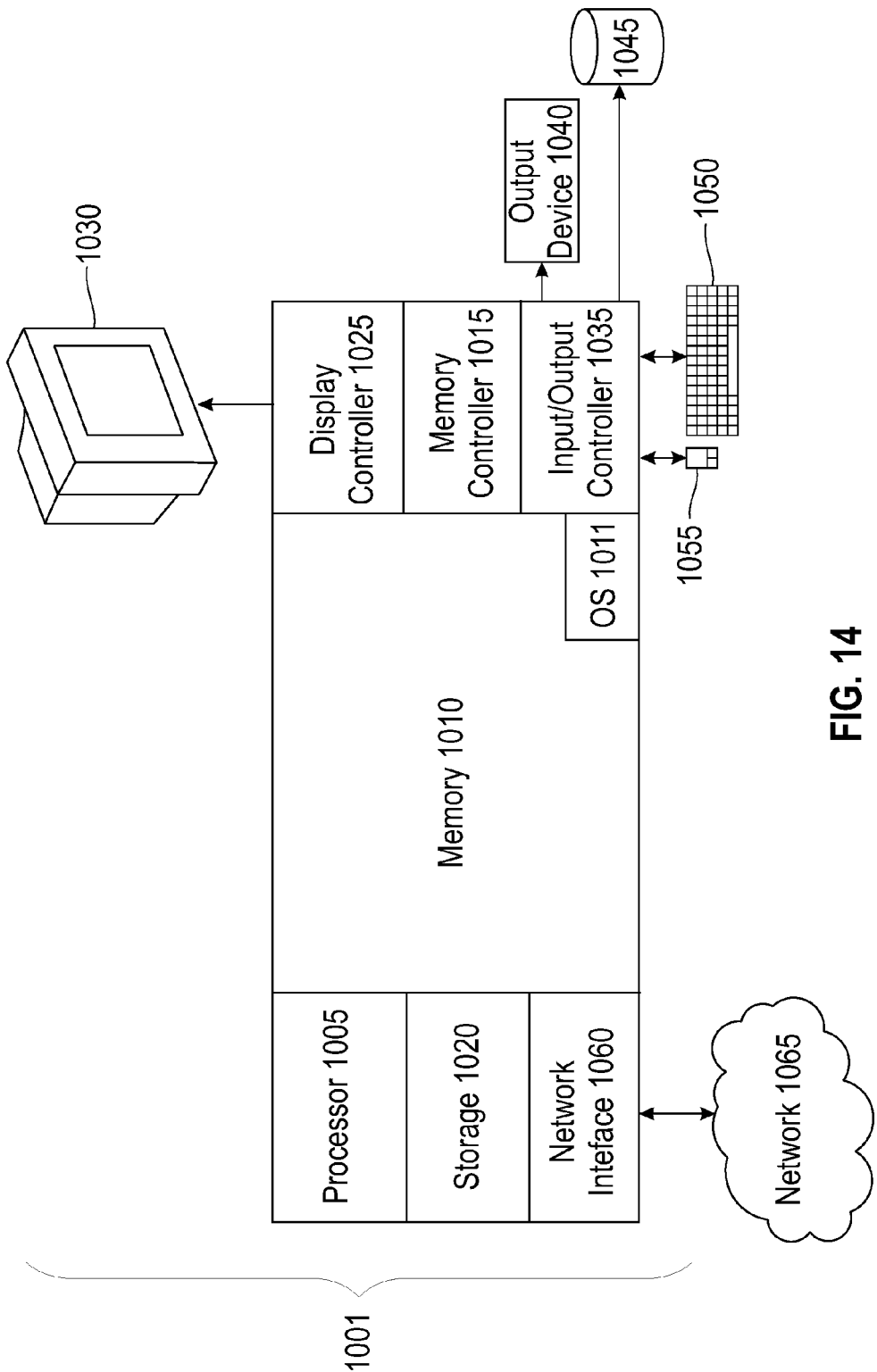
FIG. 14 illustrates an exemplary embodiment of a system for interactive generation of integrated schemas.

FIG. 14 illustrates an exemplary embodiment of a system 1000 for interactive generation of integrated schemas. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1000 therefore includes general-purpose computer 1001.

In exemplary embodiments, in terms of hardware architecture, as shown in FIG. 14, the computer 1001 includes a processor 1005, memory 1010 coupled to a memory controller 1015, and one or more input and/or output (I/O) devices 1040, 1045 (or peripherals) that are communicatively coupled via a local input/output controller 1035. The input/output controller 1035 can be, for example but not limited to, one or more buses or other wired or wireless connections, as is known in the art. The input/output controller 1035 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1005 is a hardware device for executing software, particularly that stored in memory 1010. The processor 1005 can be any custom made or commercially available processor, a central processing unit (CPU), an auxiliary processor among several processors associated with the computer 1001, a semiconductor based microprocessor (in the form of a microchip or chip set), a macroprocessor, or generally any device for executing software instructions.

The memory 1010 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1010 may incorporate electronic, magnetic, optical, and/or other types of storage media. Note that the memory 1010 can have a distributed architecture, where various components are situated remote from one another, but can be accessed by the processor 1005.

The software in memory 1010 may include one or more separate programs, each of which comprises an ordered listing of executable instructions for implementing logical functions. In the example of FIG. 14, the software in the memory 1010 includes the interactive generation of integrated schema methods described herein in accordance with exemplary embodiments and a suitable operating system (OS) 1011. The operating system 1011 essentially controls the execution of other computer programs, such the interactive generation of integrated schema systems and methods described herein, and provides scheduling, input-output control, file and data management, memory management, and communication control and related services.

The interactive generation of integrated schema methods described herein may be in the form of a source program, executable program (object code), script, or any other entity comprising a set of instructions to be performed. When a source program, then the program needs to be translated via a compiler, assembler, interpreter, or the like, which may or may not be included within the memory 1010, so as to operate properly in connection with the OS 1011. Furthermore, the interactive generation of integrated schema methods can be written as an object oriented programming language, which has classes of data and methods, or a procedure programming language, which has routines, subroutines, and/or functions.

In exemplary embodiments, a conventional keyboard 1050 and mouse 1055 can be coupled to the input/output controller 1035. Other output devices such as the I/O devices 1040, 1045 may include input devices, for example but not limited to a printer, a scanner, microphone, and the like. Finally, the I/O devices 1040, 1045 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1000 can further include a display controller 1025 coupled to a display 1030. In exemplary embodiments, the system 1000 can further include a network interface 1060 for coupling to a network 1065. The network 1065 can be an IP-based network for communication between the computer 1001 and any external server, client and the like via a broadband connection. The network 1065 transmits and receives data between the computer 1001 and external systems. In exemplary embodiments, network 1065 can be a managed IP network administered by a service provider. The network 1065 may be implemented in a wireless fashion, e.g., using wireless protocols and technologies, such as WiFi, WiMax, etc. The network 1065 can also be a packet-switched network such as a local area network, wide area network, metropolitan area network, Internet network, or other similar type of network environment. The network 1065 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1001 is a PC, workstation, intelligent device or the like, the software in the memory 1010 may further include a basic input output system (BIOS) (omitted for simplicity). The BIOS is a set of essential software routines that initialize and test hardware at startup, start the OS 1011, and support the transfer of data among the hardware devices. The BIOS is stored in ROM so that the BIOS can be executed when the computer 1001 is activated.

When the computer 1001 is in operation, the processor 1005 is configured to execute software stored within the memory 1010, to communicate data to and from the memory 1010, and to generally control operations of the computer 1001 pursuant to the software. The interactive generation of integrated schema methods described herein and the OS 1011, in whole or in part, but typically the latter, are read by the processor 1005, perhaps buffered within the processor 1005, and then executed.

When the systems and methods described herein are implemented in software, as is shown in FIG. 14, it the methods can be stored on any computer readable medium, such as storage 1020, for use by or in connection with any computer related system or method. In the context of this document, a computer readable medium is an electronic, magnetic, optical, or other physical device or means that can contain or store a computer program for use by or in connection with a computer related system or method. The interactive generation of integrated schema methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the interactive generation of integrated schema methods are implemented in hardware, the interactive generation of integrated schema methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method for schema integration, the method comprising:
   recasting a first source schema into a first graph of concepts with HasA relationships;
   recasting a second source schema into a second graph of concepts with HasA relationships;
   identifying matching concepts in the first graph and the second graph based on correspondences between attributes of the concepts of the first and second graphs;
   enumerating the first graph of concepts and the second graph of concepts to output a plurality of integrated schemas that consider choices of concepts that merge and concepts that do not merge;
   applying enumeration constraints to determine how the concepts merge;
   producing an integrated schema from the plurality of integrated schemas, based on a fixed specification of matching concepts to merge; and
   generating a mapping from the first source schema to the integrated schema and from the second source schema to the integrated schema.

2. The method as claimed in claim 1, further comprising receiving real-time input on whether to merge redundant relationships.

3. The method as claimed in claim 1 wherein each concept of the first graph represents a category of data that exists according to the first source schema.

4. The method as claimed in claim 3 wherein each concept of the second graph represents a category of data that exists according to the second source schema, and wherein each concept of the first and second graph is a relation name with an associated set of attributes.

5. The method as claimed in claim 1 wherein the integrated schema preserves all attributes and relationships of the first source schema and the second source schema.

6. A method for schema integration comprising:
   recasting a first source schema into a first graph of concepts with HasA relationships;
   recasting a second source schema into a second graph of concepts with HasA relationships;
   identifying matching concepts in the first graph and the second graph based on correspondences between attributes of the concepts;
   enumerating the first graph of concepts and the second graph of concepts to output a plurality of integrated schemas that consider choices of concepts that merge and concepts that do not merge;
   applying enumeration constraints to determine how the concepts merge; and
   systematically determining alternative integrated schemas and associated mappings, based on identifying possible choices of matching concepts to merge to produce an integrated schema from the plurality of integrated schemas.

7. The method as claimed in claim 6, wherein each alternative integrated schema is determined on demand in combination with user interaction.

8. The method as claimed in claim 6 wherein each concept of the first graph represents a category of data that exists according to the first source schema.

9. The method as claimed in claim 8 wherein each concept of the second graph represents a category of data that exists according to the second source schema, and wherein each concept of the first and second graph is a relation name with an associated set of attributes.

10. The method as claimed in claim 6 wherein the systematically determining avoids exploring configurations that output a duplicate alternative integrated schema.

11. A computer program product for schema integration, the computer program product including a non-transitory computer readable medium storing instructions for causing a computer to implement a method, the method comprising:
- recasting a first source schema into a first graph of concepts with HasA relationships;
- recasting a second source schema into a second graph of concepts with HasA relationships;
- identifying matching concepts in the first graph and the second graph based on correspondences between attributes of the concepts of the first and second graphs;
- enumerating the first graph of concepts and the second graph of concepts to output a plurality of integrated schemas that consider choices of concepts that merge and concepts that do not merge;
- applying enumeration constraints to determine how the concepts merge;
- producing an integrated schema from the plurality of integrated schemas, based on a fixed specification of matching concepts to merge; and
- generating a mapping from the first source schema to the integrated schema and from the second source schema to the integrated schema.

12. The computer program product as claimed in claim 11, further comprising receiving real-time input on whether to merge redundant relationships.

13. The computer program product as claimed in claim 11 wherein each concept of the first graph represents a category of data that exists according to the first source schema.

14. The computer program product as claimed in claim 13 wherein each concept of the second graph represents a category of data that exists according to the second source schema, and wherein each concept of the first and second graph is a relation name with an associated set of attributes.

15. The computer program product as claimed in claim 11 wherein the integrated schema preserves all attributes and relationships of the first source schema and the second source schema.

16. A computer program product for schema integration, the computer program product including a non-transitory computer readable medium storing instructions for causing a computer to implement a method, the method comprising:
- recasting a first source schema into a first graph of concepts with HasA relationships;
- recasting a second source schema into a second graph of concepts with HasA relationships;
- identifying matching concepts in the first graph and the second graph based on correspondences between attributes of the concepts;
- enumerating the first graph of concepts and the second graph of concepts to output a plurality of integrated schemas that consider choices of concepts that merge and concepts that do not merge;
- applying enumeration constraints to determine how the concepts merge; and
- systematically determining alternative integrated schemas and associated mappings, based on identifying possible choices of matching concepts to merge to produce an integrated schema from the plurality of integrated schemas.

17. The computer program product as claimed in claim 16, wherein each alternative integrated schema is determined on demand in combination with user interaction.

18. The computer program product as claimed in claim 16 wherein each concept of the first graph represents a category of data that exists according to the first source schema.

19. The computer program product as claimed in claim 18 wherein each concept of the second graph represents a category of data that exists according to the second source schema, and wherein each concept of the first and second graph is a relation name with an associated set of attributes.

20. The computer program product as claimed in claim 16 wherein the systematically determining avoids exploring configurations that output a duplicate alternative integrated schema.

* * * * *